United States Patent
Yu et al.

(10) Patent No.: US 11,057,930 B2
(45) Date of Patent: Jul. 6, 2021

(54) METHOD, SYSTEM, AND TERMINAL DEVICE FOR DATA TRANSMISSION IN UNLICENSED SPECTRUM

(71) Applicant: HUAWEI TECHNOLOGIES CO., LTD., Guangdong (CN)

(72) Inventors: Haifeng Yu, Beijing (CN); Feng Yu, Beijing (CN); Guangwei Yu, Beijing (CN); Wurong Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 241 days.

(21) Appl. No.: 16/115,328

(22) Filed: Aug. 28, 2018

(65) Prior Publication Data
US 2019/0014595 A1 Jan. 10, 2019

Related U.S. Application Data

(63) Continuation of application No. PCT/CN2016/074873, filed on Feb. 29, 2016.

(51) Int. Cl.
*H04W 74/02* (2009.01)
*H04W 16/14* (2009.01)
(Continued)

(52) U.S. Cl.
CPC .......... *H04W 74/02* (2013.01); *H04W 16/14* (2013.01); *H04W 72/1268* (2013.01); *H04W 72/1284* (2013.01); *H04W 74/08* (2013.01)

(58) Field of Classification Search
CPC ...... H04L 5/14; H04W 24/08; H04W 76/046; H04W 72/042
See application file for complete search history.

(56) References Cited

U.S. PATENT DOCUMENTS

2008/0181097 A1* 7/2008 Goldberg ............ H04L 25/0236
370/210
2010/0054145 A1 3/2010 Frenger et al.
(Continued)

FOREIGN PATENT DOCUMENTS

CN 101558679 A 10/2009
CN 101997600 A 3/2011
(Continued)

OTHER PUBLICATIONS

IEEE Std 802.15.4™-2011, IEEE Standard for Local and metropolitan area networks—Part 15.4: Low-Rate Wireless Personal Area Networks (LR-WPANs),IEEE Computer Society,dated Sep. 5, 2011,total 314 pages.

*Primary Examiner* — Romani Ohri
(74) *Attorney, Agent, or Firm* — Womble Bond Dickinson (US) LLP

(57) ABSTRACT

The present disclosure provides a method, system, and terminal device for data transmission in an unlicensed spectrum, effectively reduce mutual signal interference between different systems while meeting regulation constraints on use of the unlicensed spectrum. The method in the present disclosure includes: at a processing start moment of a terminal device in a current channel occupancy time window of a network device, when remaining duration of the current channel occupancy time window of the network device is greater than or equal to duration for the terminal device to transmit a to-be-sent data packet to the network device, selecting based on a user attribute of the terminal device and from a mapping relationship between a user attribute and a transmission mode; and sending the to-be-sent data packet to the network device in the selected transmission mode.

20 Claims, 8 Drawing Sheets

(51) Int. Cl.
*H04W 74/08* (2009.01)
*H04W 72/12* (2009.01)

(56) References Cited

U.S. PATENT DOCUMENTS

| | | | |
|---|---|---|---|
| 2012/0129522 A1 | 5/2012 | Kim et al. | |
| 2014/0098761 A1 | 4/2014 | Lee et al. | |
| 2014/0328183 A1* | 11/2014 | Au | H04W 28/0284 370/237 |
| 2015/0004994 A1 | 1/2015 | Hwang et al. | |
| 2015/0009843 A1* | 1/2015 | Takahashi | H04W 52/243 370/252 |
| 2015/0124902 A1* | 5/2015 | Goto | H04L 27/2627 375/295 |
| 2015/0350949 A1* | 12/2015 | Wang | H04W 16/14 370/230 |
| 2016/0057770 A1* | 2/2016 | Yerramalli | H04W 74/08 370/329 |
| 2016/0135148 A1* | 5/2016 | Novlan | H04L 1/00 370/329 |
| 2016/0219498 A1* | 7/2016 | Abraham | H04W 72/0446 |
| 2017/0142740 A1* | 5/2017 | Gou | H04W 72/12 |
| 2017/0339588 A1* | 11/2017 | Moon | H04W 24/08 |
| 2018/0175975 A1* | 6/2018 | Um | H04W 16/14 |
| 2018/0227953 A1* | 8/2018 | Kusashima | H04W 72/12 |
| 2018/0324860 A1* | 11/2018 | Mattsson | H04W 74/0816 |

FOREIGN PATENT DOCUMENTS

| | | |
|---|---|---|
| CN | 103781187 A | 5/2014 |
| CN | 104955111 A | 9/2015 |
| CN | 105282855 A | 1/2016 |
| EP | 3154302 A1 | 4/2017 |
| KR | 20130104426 A | 9/2013 |
| KR | 20130109179 A | 10/2013 |
| KR | 20160005759 A | 1/2016 |
| WO | 2015042396 A1 | 3/2015 |
| WO | 2016000549 A1 | 1/2016 |

* cited by examiner

| Clear channel assessment CCA time window | First time window | Second time window | Third time window |
|---|---|---|---|

Channel occupancy time window

METHOD, SYSTEM, AND TERMINAL DEVICE FOR DATA TRANSMISSION IN UNLICENSED SPECTRUM

CROSS-REFERENCE TO RELATED APPLICATIONS

This application is a continuation of International Application No. PCT/CN2016/074873, filed on Feb. 29, 2016, the disclosure of which is hereby incorporated by reference in its entirety.

TECHNICAL FIELD

The present disclosure relates to the wireless communications field, and in particular, to a method, system, and terminal device for data transmission in an unlicensed spectrum.

BACKGROUND

Wireless communication between communications devices is implemented by using a spectrum. Spectrums may be roughly classified into two types. One type is a licensed spectrum, and the other type is an unlicensed spectrum.

A plurality of systems share an unlicensed band. Therefore, for use of an unlicensed spectrum, to avoid mutual signal interference between the plurality of systems, a communications device can perform communication by using an unlicensed spectrum only after determining that the unlicensed spectrum is idle. A process in which the communications device detects whether the unlicensed spectrum is occupied is referred to as a listen before talk (LBT) process.

Communications devices in different systems have different detection capabilities. Due to effect of a detection capability difference, a terminal device in a relatively far location in coverage of a network device has severe signal attenuation. Therefore, when performing an LBT process, another terminal device may not detect communication between the network device and this type of terminal device that is in the relatively far location in the coverage, and the another terminal device occupies an unlicensed spectrum for data transmission, causing mutual signal interference between different systems, and relatively low overall network performance.

For use of an unlicensed spectrum, if a communications device performs communication in a scheduling-based transmission mode by using an unlicensed spectrum, mutual signal interference between systems may be reduced to an extent. However, this scheduling-based transmission mode is not applicable to all terminal devices. A terminal device in a relatively far location in coverage of a network device has severe signal attenuation. Therefore, the network device may need to send a scheduling instruction to the terminal device a plurality of times by using a downlink channel, so that the terminal device can learn of a spectrum resource allocated by the network device. Consequently, scheduling signaling overheads are increased in this manner. Because downlink channel resources used for scheduling signaling transmission are limited, the scheduling-based transmission mode is unsuitable for this type of terminal device that is in the relatively far location in the coverage to transmit data to the network device.

In conclusion, there is an urgent need to design a data transmission solution in an unlicensed spectrum, to avoid mutual signal interference between different systems while meeting regulation constraints on use of the unlicensed spectrum, thereby improving overall network performance.

SUMMARY

Embodiments of the present disclosure provide a method, system, and terminal device for data transmission in an unlicensed spectrum, so as to implement data transmission between a terminal device and a network device in an unlicensed spectrum, and effectively reduce mutual signal interference between different systems while meeting regulation constraints on use of the unlicensed spectrum.

According to an aspect, an embodiment of the present disclosure provides a method for data transmission in an unlicensed spectrum, including:

at a processing start moment of a terminal device in a current channel occupancy time window of a network device, when remaining duration of the current channel occupancy time window of the network device is greater than or equal to duration for the terminal device to transmit a to-be-sent data packet to the network device, selecting, by the terminal device, based on a user attribute of the terminal device and an attribute of the to-be-sent data packet and from a mapping relationship between a user attribute, a data packet attribute, and a transmission mode, a transmission mode used by the terminal device to transmit the to-be-sent data packet to the network device, where the user attribute in the mapping relationship includes the user attribute of the terminal device, and the user attribute of the terminal device is a center user or an edge user; and the data packet attribute in the mapping relationship includes the attribute of the to-be-sent data packet, and the attribute of the to-be-sent data packet is a large data packet or a small data packet; and transmitting, by the terminal device, the to-be-sent data packet to the network device in the selected transmission mode.

In a possible design, each channel occupancy time window of the network device includes a first time window and a third time window, the first time window is used by the terminal device to perform system synchronization with the network device, and the third time window is used by the terminal device to transmit a data packet to the network device in a selected transmission mode; or each channel occupancy time window of the network device includes a first time window, a second time window, and a third time window, the first time window is used by the terminal device to perform system synchronization with the network device, and the second time window and the third time window are used by the terminal device to transmit a data packet to the network device in a selected transmission mode.

The terminal device performs system synchronization with the network device in the first time window, so that the terminal device learns of configuration information of the current channel occupancy time window of the network device through system synchronization.

In a possible design, when each channel occupancy time window of the network device includes a first time window and a third time window, the mapping relationship includes:

a transmission mode selected by a terminal device whose user attribute is an edge user and whose to-be-sent data packet has an attribute of a large data packet or a small data packet is a first transmission mode, or a transmission mode selected by a terminal device whose user attribute is a center user and whose to-be-sent data packet has an attribute of a small data packet is a first transmission mode, where the first transmission mode includes: transmitting, by the terminal device, the to-be-sent data packet to the network device by using an available uplink channel in a third time window of the current channel occupancy time window of the network device.

The terminal device that selects the first transmission mode may send the to-be-sent data packet to the network device in a contention manner or a low duty cycle manner, so as to stagger processes of sending data packets by terminal devices, thereby effectively reducing mutual signal interference between different systems.

In a possible design, when each channel occupancy time window of the network device further includes a second time window, the first transmission mode further includes:

in a second time window of a channel occupancy time window next to the current channel occupancy time window of the network device, receiving, by the terminal device by monitoring a downlink channel, acknowledgement information fed back by the network device, where the acknowledgement information is used to indicate whether the network device successfully receives the to-be-sent data packet transmitted by the terminal device.

In a possible design, when each channel occupancy time window of the network device includes a first time window, a second time window, and a third time window, the mapping relationship includes:

a transmission mode selected by a terminal device whose user attribute is a center user and whose to-be-sent data packet has an attribute of a large data packet is a second transmission mode, where the second transmission mode includes:

sending, by the terminal device, a buffer status report (BSR) to the network device by using an available uplink channel in a third time window of the current channel occupancy time window of the network device, where the BSR is used to request the network device to allocate a data packet transmission resource;

in a second time window of a channel occupancy time window next to the current channel occupancy time window of the network device, obtaining, by the terminal device by monitoring a downlink channel, a data packet transmission resource allocated by the network device; and transmitting, by the terminal device, the to-be-sent data packet to the network device by using the data packet transmission resource allocated by the network device.

The terminal device that selects the second transmission mode sends the data packet to the network device in a scheduling-based transmission mode, so as to effectively reduce mutual signal interference between different systems.

In a possible design, the second transmission mode further includes:

after the terminal device transmits the to-be-sent data packet to the network device, receiving, by the terminal device by monitoring a downlink channel, acknowledgement information fed back by the network device, where the acknowledgement information is used to indicate whether the network device successfully receives the to-be-sent data packet transmitted by the terminal device.

In a possible design, because the to-be-sent data packet of the terminal device that selects the second transmission mode has the attribute of a large data packet, if data packet transmission resources allocated by the network device a current time are insufficient for the terminal device to transmit the to-be-sent data packet to the network device, the terminal device may carry the BSR while sending the data packet to the network device, so as to prevent a problem that resources are wasted because the terminal device independently sends the BSR again to the network device, to request the network device to allocate a data packet transmission resource.

In a possible design, before the selecting, by the terminal device, a transmission mode used by the terminal device to transmit the to-be-sent data packet to the network device, the method further includes:

determining, by the terminal device, that a quantity of data packets to be transmitted by the terminal device to the network device is less than or equal to a first threshold.

In a possible design, after the terminal device transmits the to-be-sent data packet to the network device, if the terminal device still has a data packet that needs to continue to be sent, the terminal device does not need to wait to receive the acknowledgement information fed back by the network device, and instead, the terminal device can continue to send the data packet to the network device in the third time window of the current channel occupancy time window of the network device, provided that remaining duration of the third time window of the current channel occupancy time window of the network device meets duration for continuing to send the data packet, and that a quantity of data packets to be sent by the terminal device is less than or equal to the first threshold.

In a possible design, the terminal device obtains, by monitoring a downlink channel, the acknowledgement information fed back by the network device. The acknowledgement information may be further used to indicate whether the network device successfully receives each data packet transmitted by the terminal device. To be specific, the network device feeds back, to a terminal device, receiving statuses of all data packets from the same terminal device by using one downlink channel, to reduce signaling overheads.

In a possible design, before the selecting, by the terminal device, a transmission mode used by the terminal device to transmit the to-be-sent data packet to the network device, the method further includes:

obtaining, by the terminal device, a second threshold of specified information from the network device, where the second threshold is used to determine whether the user attribute of the terminal device is a center user or an edge user, and the specified information includes a coverage level or reference signal received power (RSRP); and determining, by the terminal device, the user attribute of the terminal device based on the second threshold and a measurement result that is measured by the terminal device and that is consistent with the specified information.

In a possible design, before the selecting, by the terminal device, a transmission mode used by the terminal device to transmit the to-be-sent data packet to the network device, the method further includes:

obtaining, by the terminal device, a third threshold from the network device, where the third threshold is used to determine whether the attribute of the to-be-sent data packet is a large data packet or a small data packet; and determining, by the terminal device, the attribute of the to-be-sent data packet based on the third threshold and a size of the to-be-sent data packet.

According to another aspect, an embodiment of the present disclosure provides a method for data transmission in an unlicensed spectrum, including:

at a processing start moment of a terminal device in a current channel occupancy time window of a network device, when remaining duration of the current channel occupancy time window of the network device is greater than or equal to duration for the terminal device to transmit a to-be-sent data packet to the network device, selecting, by the terminal device, based on a user attribute of the terminal device and from a mapping relationship between a user attribute and a transmission mode, a transmission mode used by the terminal device to transmit the to-be-sent data packet to the network device, where the user attribute in the mapping relationship includes the user attribute of the terminal device, and the user attribute of the terminal device is a center user or an edge user; and transmitting, by the terminal device, the to-be-sent data packet to the network device in the selected transmission mode.

In a possible design, each channel occupancy time window of the network device includes a first time window and a third time window, the first time window is used by the terminal device to perform system synchronization with the network device, and the third time window is used by the terminal device to transmit a data packet to the network device in a selected transmission mode; or each channel occupancy time window of the network device includes a first time window, a second time window, and a third time window, the first time window is used by the terminal device to perform system synchronization with the network device, and the second time window and the third time window are used by the terminal device to transmit a data packet to the network device in a selected transmission mode.

In a possible design, when each channel occupancy time window of the network device includes a first time window and a third time window, the mapping relationship includes:

a transmission mode selected by a terminal device whose user attribute is an edge user is a first transmission mode, where the first transmission mode includes: transmitting, by the terminal device, the to-be-sent data packet to the network device by using an available uplink channel in a third time window of the current channel occupancy time window of the network device.

In a possible design, when each channel occupancy time window of the network device further includes a second time window, the first transmission mode further includes:

in a second time window of a channel occupancy time window next to the current channel occupancy time window of the network device, obtaining, by the terminal device by monitoring a downlink channel, acknowledgement information fed back by the network device, where the acknowledgement information is used to indicate whether the network device successfully receives the to-be-sent data packet transmitted by the terminal device.

In a possible design, when each channel occupancy time window of the network device includes a first time window, a second time window, and a third time window, the mapping relationship includes:

a transmission mode selected by a terminal device whose user attribute is a center user is a second transmission mode, where the second transmission mode includes:

sending, by the terminal device, a buffer status report (BSR) to the network device by using an available uplink channel in a third time window of the current channel occupancy time window of the network device, where the BSR is used to request the network device to allocate a data packet transmission resource;

in a second time window of a channel occupancy time window next to the current channel occupancy time window of the network device, obtaining, by the terminal device by monitoring a physical downlink channel, a data packet transmission resource allocated by the network device; and transmitting, by the terminal device, the to-be-sent data packet to the network device by using the data packet transmission resource allocated by the network device.

In a possible design, the second transmission mode further includes:

after the terminal device transmits the to-be-sent data packet to the network device, obtaining, by the terminal device by monitoring a downlink channel, acknowledgement information fed back by the network device, where the acknowledgement information is used to indicate whether the network device successfully receives the to-be-sent data packet transmitted by the terminal device.

In a possible design, before the selecting, by the terminal device, a transmission mode used by the terminal device to transmit the to-be-sent data packet to the network device, the method further includes:

determining, by the terminal device, that a quantity of data packets to be transmitted by the terminal device to the network device is less than or equal to a first threshold.

In a possible design, before the selecting, by the terminal device, a transmission mode used by the terminal device to transmit the to-be-sent data packet to the network device, the method further includes:

obtaining, by the terminal device, a second threshold of specified information from the network device, where the second threshold is used to determine whether the user attribute of the terminal device is a center user or an edge user, and the specified information includes a coverage level or reference signal received power (RSRP); and determining, by the terminal device, the user attribute of the terminal device based on the second threshold and a measurement result that is measured by the terminal device and that is consistent with the specified information.

According to another aspect, an embodiment of the present disclosure provides a terminal device, and the terminal device has functions of implementing operations of the terminal device in the foregoing method design. The functions may be implemented by hardware, or may be implemented by hardware by executing corresponding software. The hardware or the software includes one or more modules corresponding to the foregoing functions. The module may be software and/or hardware.

In a possible design, a structure of the terminal device includes a processor and a transmitter. The processor is configured to select, based on a user attribute of the terminal device and an attribute of a to-be-sent data packet and from a mapping relationship between a user attribute, a data packet attribute, and a transmission mode, a transmission mode used by the transmitter to transmit the to-be-sent data packet to a network device; or the processor is configured to select, based on a user attribute of the terminal device and from a mapping relationship between a user attribute and a transmission mode, a transmission mode used by the sending module to transmit the to-be-sent data packet to a network device. The transmitter is configured to support communication between the terminal device and the network device. The transmitter supports transmission of the to-be-sent data packet to the network device in the transmission mode selected by the processor. The terminal device may further include a memory. The memory is configured to couple with the processor, and the memory stores a program instruction and data that are necessary for the terminal device.

In a possible design, the structure of the terminal device may further include a receiver. The receiver is configured to support communication between the terminal device and the network device. The receiver supports receiving of downlink information sent by the network device to the terminal device. The downlink information is used by the processor of the terminal device to select the transmission mode.

According to another aspect, an embodiment of the present disclosure provides a method for data transmission in an unlicensed spectrum, including:

determining, by a network device, downlink information, where the downlink information includes a current channel occupancy time window of the network device, a processing start moment of a terminal device in the current channel occupancy time window, and a mapping relationship between a user attribute, a data packet attribute, and a transmission mode, where the user attribute in the mapping relationship includes a center user and an edge user, and the data packet attribute in the mapping relationship includes a large data packet and a small data packet; and sending, by the network device, the downlink information to the terminal device, where the downlink information is used by the terminal device to select a transmission mode used by the terminal device to transmit a to-be-sent data packet to the network device.

In a possible design, each channel occupancy time window of the network device includes a first time window and a third time window, the first time window is used by the terminal device to perform system synchronization with the network device, and the third time window is used by the terminal device to transmit a data packet to the network device in a selected transmission mode; or each channel occupancy time window of the network device includes a first time window, a second time window, and a third time window, the first time window is used by the terminal device to perform system synchronization with the network device, and the second time window and the third time window are used by the terminal device to transmit a data packet to the network device in a selected transmission mode.

In a possible design, when each channel occupancy time window of the network device includes a first time window and a third time window, the mapping relationship includes:

a transmission mode selected by a terminal device whose user attribute is an edge user and whose to-be-sent data packet has an attribute of a large data packet or a small data packet is a first transmission mode, or a transmission mode selected by a terminal device whose user attribute is a center user and whose to-be-sent data packet has an attribute of a small data packet is a first transmission mode, where the first transmission mode includes: transmitting, by the terminal device, the to-be-sent data packet to the network device by using an available uplink channel in a third time window of the current channel occupancy time window of the network device.

In a possible design, when each channel occupancy time window of the network device further includes a second time window, the first transmission mode further includes:

in a second time window of a channel occupancy time window next to the current channel occupancy time window of the network device, receiving, by the terminal device by monitoring a downlink channel, acknowledgement information fed back by the network device, where the acknowledgement information is used to indicate whether the network device successfully receives the to-be-sent data packet transmitted by the terminal device.

In a possible design, when each channel occupancy time window of the network device includes a first time window, a second time window, and a third time window, the mapping relationship includes:

a transmission mode selected by a terminal device whose user attribute is a center user and whose to-be-sent data packet has an attribute of a large data packet is a second transmission mode, where the second transmission mode includes:

sending, by the terminal device, a buffer status report (BSR) to the network device by using an available uplink channel in a third time window of the current channel occupancy time window of the network device, where the BSR is used to request the network device to allocate a data packet transmission resource;

in a second time window of a channel occupancy time window next to the current channel occupancy time window of the network device, obtaining, by the terminal device by monitoring a downlink channel, a data packet transmission resource allocated by the network device; and transmitting, by the terminal device, the to-be-sent data packet to the network device by using the data packet transmission resource allocated by the network device.

In a possible design, the second transmission mode further includes:

after the terminal device transmits the to-be-sent data packet to the network device, receiving, by the terminal device by monitoring a downlink channel, acknowledgement information fed back by the network device, where the acknowledgement information is used to indicate whether the network device successfully receives the to-be-sent data packet transmitted by the terminal device.

In a possible design, the downlink information further includes a first threshold, and the first threshold is used by the terminal device to determine whether the terminal device meets a data packet transmission condition.

The network device sets and dynamically adjusts the first threshold based on a quantity of available uplink channel resources in the third time window and a processing capability of the network device. The processing capability of the network device includes a configuration of a downlink channel and a configuration of a data packet transmission resource (an uplink channel) in the second time window, and the like, so as to achieve load balance while ensuring resource utilization in the third time window.

In a possible design, the downlink information further includes a second threshold of specified information, the specified information includes a coverage level or reference signal received power (RSRP), and the second threshold is used to determine whether a user attribute of the terminal device is a center user or an edge user.

In a possible design, the downlink information further includes a third threshold, and the third threshold is used to determine whether an attribute of the to-be-sent data packet of the terminal device is a large data packet or a small data packet.

According to another aspect, an embodiment of the present disclosure provides a method for data transmission in an unlicensed spectrum, including:

determining, by a network device, downlink information, where the downlink information includes a current channel occupancy time window of the network device, a processing start moment of a terminal device in the current channel occupancy time window, and a mapping relationship between a user attribute and a transmission mode, where the user attribute in the mapping relationship includes a center user and an edge user; and sending, by the network device, the downlink information to the terminal device, where the downlink information is used by the terminal device to select a transmission mode used by the terminal device to transmit a to-be-sent data packet to the network device.

In a possible design, each channel occupancy time window of the network device includes a first time window and a third time window, the first time window is used by the terminal device to perform system synchronization with the network device, and the third time window is used by the terminal device to transmit a data packet to the network device in a selected transmission mode; or each channel occupancy time window of the network device includes a first time window, a second time window, and a third time window, the first time window is used by the terminal device to perform system synchronization with the network device, and the second time window and the third time window are used by the terminal device to transmit a data packet to the network device in a selected transmission mode.

In a possible design, when each channel occupancy time window of the network device includes a first time window and a third time window, the mapping relationship includes:

a transmission mode selected by a terminal device whose user attribute is an edge user is a first transmission mode, where the first transmission mode includes: transmitting, by the terminal device, the to-be-sent data packet to the network device by using an available uplink channel in a third time window of the current channel occupancy time window of the network device.

In a possible design, when each channel occupancy time window of the network device further includes a second time window, the first transmission mode further includes:

in a second time window of a channel occupancy time window next to the current channel occupancy time window of the network device, obtaining, by the terminal device by monitoring a downlink channel, acknowledgement information fed back by the network device, where the acknowledgement information is used to indicate whether the network device successfully receives the to-be-sent data packet transmitted by the terminal device.

In a possible design, when each channel occupancy time window of the network device includes a first time window, a second time window, and a third time window, the mapping relationship includes:

a transmission mode selected by a terminal device whose user attribute is a center user is a second transmission mode, where the second transmission mode includes:

sending, by the terminal device, a buffer status report (BSR) to the network device by using an available uplink channel in a third time window of the current channel occupancy time window of the network device, where the BSR is used to request the network device to allocate a data packet transmission resource;

in a second time window of a channel occupancy time window next to the current channel occupancy time window of the network device, obtaining, by the terminal device by monitoring a physical downlink channel, a data packet transmission resource allocated by the network device; and transmitting, by the terminal device, the to-be-sent data packet to the network device by using the data packet transmission resource allocated by the network device.

In a possible design, the second transmission mode further includes:

after the terminal device transmits the to-be-sent data packet to the network device, obtaining, by the terminal device by monitoring a downlink channel, acknowledgement information fed back by the network device, where the acknowledgement information is used to indicate whether the network device successfully receives the to-be-sent data packet transmitted by the terminal device.

In a possible design, the downlink information further includes a first threshold, and the first threshold is used to determine whether the terminal device meets a data packet transmission condition.

In a possible design, the downlink information further includes a second threshold of specified information, the specified information includes a coverage level or reference signal received power (RSRP), and the second threshold is used to determine whether a user attribute of the terminal device is a center user or an edge user.

According to another aspect, an embodiment of the present disclosure provides a network device, and the network device has functions of implementing operations of the network device in the foregoing method. The functions may be implemented by hardware, or may be implemented by hardware by executing corresponding software. The hardware or the software includes one or more modules corresponding to the foregoing functions.

In a possible design, a structure of the network device includes a processor and a transmitter. The processor is configured to support the network device in performing a corresponding function in the foregoing method. The processor is configured to determine downlink information to be sent to a terminal device. The transmitter is configured to: support communication between the network device and the terminal device, and send the downlink information in the foregoing method to the terminal device. The network device may further include a memory. The memory is configured to couple with the processor, and the memory stores a program instruction and data that are necessary for the network device.

In a possible design, the network device may further include a receiver. The receiver is configured to: support communication between the network device and the terminal device, and receive the data packet, in the foregoing method, sent by the terminal device.

According to another aspect, an embodiment of the present disclosure provides a system for data communication in an unlicensed spectrum, and the system includes the network device and the terminal device described in the foregoing aspects.

In the technical solutions provided in the embodiments of the present disclosure, a mixed transmission method based on contention and scheduling is used. The network device sends the downlink information to the terminal device, and the terminal device properly selects, based on the downlink information, the transmission mode used by the terminal device to transmit the to-be-sent data packet to the network device. The terminal device selects a data packet transmission mode with reference to the user attribute and a data packet attribute, or the terminal device selects a data packet transmission mode with reference to the user attribute, so as to more flexibly use an unlicensed spectrum, and effectively reduce mutual interference between different systems while meeting regulation constraints on use of the unlicensed spectrum.

DESCRIPTION OF EMBODIMENTS

Figure 1:
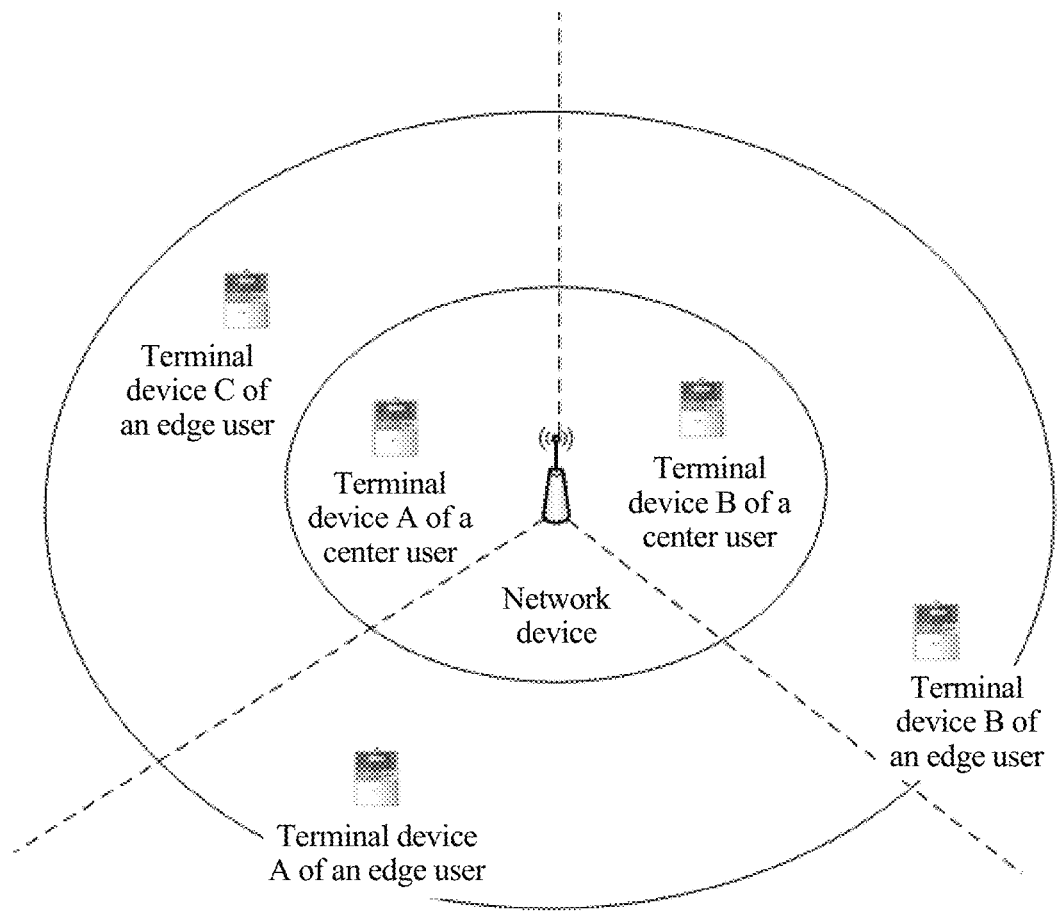
FIG. 1 is a schematic diagram of an unlicensed spectrum application scenario according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure provide a method, system, and terminal device for data transmission in an unlicensed spectrum. A mixed transmission method based on contention and scheduling is used, to implement data transmission between a terminal device and a network device in an unlicensed spectrum. In the technical solutions, the terminal device properly selects a data packet transmission mode with reference to a user attribute and a data packet attribute, or the terminal device properly selects a data packet transmission mode with reference to a user attribute, so as to more flexibly use an unlicensed spectrum. A terminal device of an edge user chooses to transmit a data packet to the network device in a contention manner or a duty cycle manner, so as to effectively reduce mutual interference between different systems while meeting regulation constraints on use of the unlicensed spectrum. The method, system, and terminal device are based on a same inventive concept. The method, system, and terminal device have similar principles for resolving the problems. Therefore, for implementation of the system, terminal device, and method, reference may be made to each other, and details of repeated parts are not described.

The terminal device in the embodiments of the present disclosure may be a device that provides a user with voice and/or data connectivity, a handheld device with a wireless connection function, or another processing device connected to a wireless modem. A wireless terminal device may communicate with one or more core networks by using a radio access network (RAN). The wireless terminal device may be a mobile terminal device, such as a mobile phone (or referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal device may be a device such as a personal communications service (PCS) phone, a cordless telephone set, a Session Initiation Protocol (SIP) phone, a wireless local loop (WLL) station, or a personal digital assistant (PDA). The wireless terminal device may also be referred to as a system, a subscriber unit, a subscriber station, a mobile station, a remote station, an access point, a remote terminal device, an access terminal device, a user terminal device, a user agent, user device, or user equipment.

The network device in the embodiments of the present disclosure may be a network device or an access point, or may be a device in communication with a wireless terminal device through one or more sectors on an air interface in an access network. The network device may be configured to mutually convert a received over-the-air frame and an Internet Protocol (IP) packet and serve as a router between the wireless terminal device and a rest portion of the access network, where the rest portion of the access network may include an Internet Protocol (IP) network. The network device may further coordinate attribute management of the air interface. For example, the network device may be a base transceiver station (BTS) in a global system for mobile communications (GSM) or Code Division Multiple Access (CDMA), or may be a NodeB in Wideband Code Division Multiple Access (WCDMA), or may be an evolved NodeB (evolved NodeB, eNB or e-NodeB) in Long Term Evolution (LTE). This is not limited in the embodiments of the present disclosure.

The technical solutions provided in the embodiments of the present disclosure are applicable to an unlicensed spectrum application scenario, such as an unlicensed spectrum less than or equal to sub-1 GHz. In an unlicensed spectrum application scenario shown in FIG. 1, coverage of a network device includes terminal devices belonging to different coverage levels. User attributes of the terminal devices may be roughly classified into a center user and an edge user based on different distances between the network device and the terminal devices, namely, different coverage levels.

The technical solutions provided in the embodiments of the present disclosure are described in detail in the following with reference to specific embodiments. It should be noted that a presentation sequence of the embodiments merely represents a sequence of the embodiments, and does not represent priorities of the technical solutions provided in the embodiments.

Embodiment 1

In a method for data transmission in an unlicensed spectrum provided in this embodiment of the present disclosure, a terminal device selects, based on a user attribute of the terminal device and an attribute of a to-be-sent data packet of the terminal device, a transmission mode used to send the data packet to a network device, so as to implement data transmission between the terminal device and the network device in an unlicensed spectrum, and effectively reduce mutual interference between different systems while meeting regulation constraints on use of the unlicensed spectrum.

Figures 2, 3:
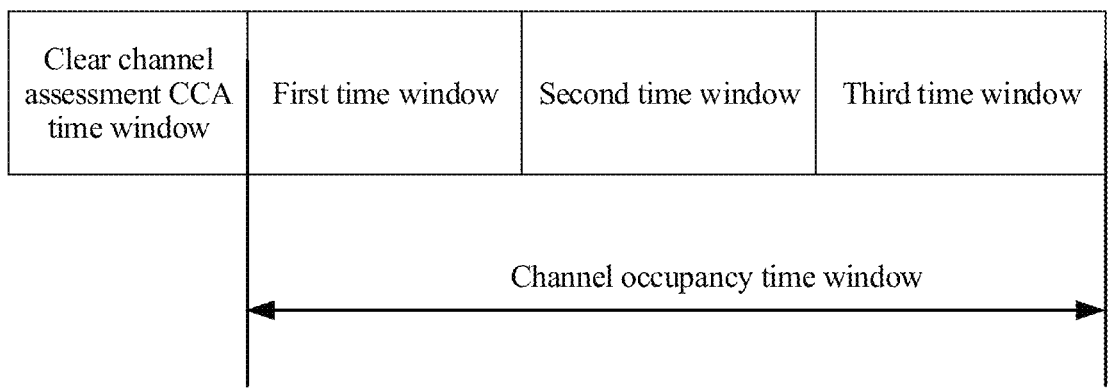
FIG. 2 is a schematic flowchart of a method for data transmission in an unlicensed spectrum according to an embodiment of the present disclosure.
FIG. 3 is a schematic diagram of an air-interface configuration of a radio frame in an unlicensed spectrum according to an embodiment of the present disclosure.

As shown in FIG. 2, this embodiment of the present disclosure provides a method for data transmission in an unlicensed spectrum, and the method includes the following steps:

S201. At a processing start moment of a terminal device in a current channel occupancy time window of a network device, when remaining duration of the current channel occupancy time window of the network device is greater than or equal to duration for the terminal device to transmit a to-be-sent data packet to the network device, the terminal device selects, based on a user attribute of the terminal device and an attribute of the to-be-sent data packet and from a mapping relationship between a user attribute, a data packet attribute, and a transmission mode, a transmission mode used by the terminal device to transmit the to-be-sent data packet to the network device.

The user attribute in the mapping relationship includes the user attribute of the terminal device, and the user attribute of the terminal device is a center user or an edge user. The data packet attribute in the mapping relationship includes the attribute of the to-be-sent data packet, and the attribute of the to-be-sent data packet is a large data packet or a small data packet.

S202. The terminal device transmits the to-be-sent data packet to the network device in the selected transmission mode.

In this embodiment of the present disclosure, an air-interface configuration of a radio frame in an unlicensed spectrum is shown in FIG. 3. The configuration in FIG. 3 includes a clear channel assessment (CCA) time window and a channel occupancy time window.

CCA time window: Before the network device uses an unlicensed spectrum, the network device performs an LBT channel monitoring process for the unlicensed spectrum in the CCA time window. The CCA time window uses a moment, as a start moment, at which the network device starts to perform channel monitoring for the unlicensed spectrum. In the CCA time window, the network device monitors, on a system operating band, whether a channel is available. To be specific, if the network device detects that there is a signal on the channel, the network device considers that the channel is in a "busy" state. This means that an unlicensed spectrum of the channel is occupied, and the CCA time window continues. Alternatively, if the network device detects that there is no signal on the channel, the network device considers that the channel is in an "idle" state. This means that an unlicensed spectrum of the channel is unoccupied, the network device can use the unlicensed spectrum, and the CCA time window ends. In the CCA time window, the terminal device may sleep or monitor whether the network device sends a signal, or the like. An operation of the terminal device in the CCA time window is not limited in this embodiment of the present disclosure.

Channel occupancy time window: After determining, in the CCA time window, that the unlicensed spectrum is unoccupied, the network device enters the channel occupancy time window, and the network device performs data transmission with the terminal device by using the unlicensed spectrum. The channel occupancy time window includes a first time window and a third time window. Preferentially, the channel occupancy time window further includes a second time window.

The terminal device performs system synchronization with the network device in the first time window. The network device sends a synchronization signal, and the terminal device receives the synchronization signal sent by the network device, so that the terminal device determines configuration information of the current channel occupancy time window of the network device through system synchronization. The configuration information includes but is not limited to a first time window, a second time window, and a third time window included in the channel occupancy time window, a time configuration of each time window of the channel occupancy time window, and the processing start moment of the terminal device in the channel occupancy time window.

The second time window may also be referred to as a contention-free window (CFW) or a scheduling window, and the third time window may also be referred to as a Contention-based window (CBW). The third time window is used by the terminal device to transmit data to the network device in a selected transmission mode. Preferentially, the second time window and the third time window are used by the terminal device to transmit data to the network device in a selected transmission mode.

Figure 4:
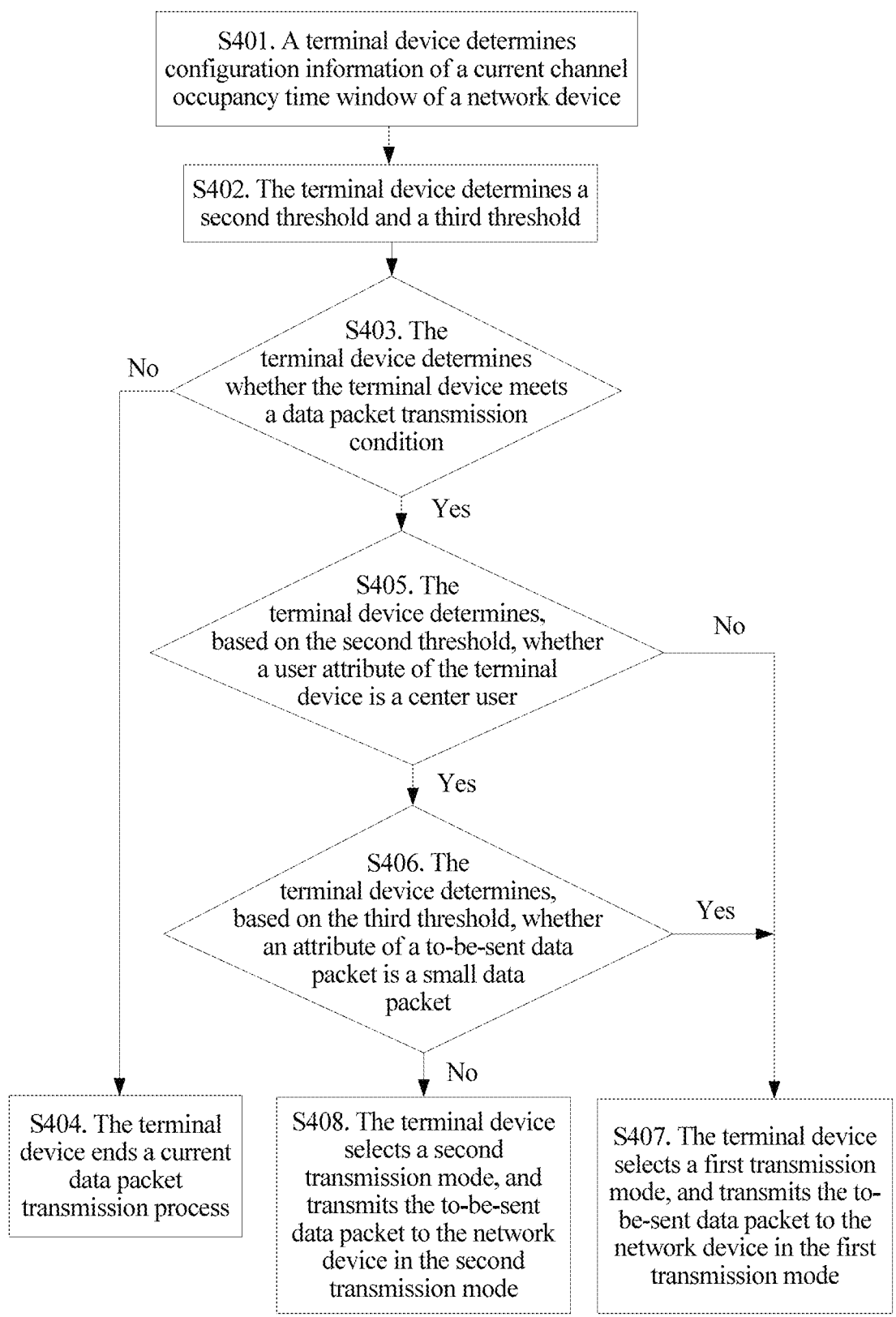
FIG. 4 is a schematic flowchart of a method for data transmission in an unlicensed spectrum according to an embodiment of the present disclosure.

With reference to FIG. 2 and FIG. 3, a procedure of the method for data transmission in an unlicensed spectrum provided in this embodiment of the present disclosure is shown in FIG. 4, and includes the following steps.

S401. A terminal device determines configuration information of a current channel occupancy time window of a network device.

In a first time window of the current channel occupancy time window of the network device, the terminal device receives a synchronization signal sent by the network device, to learn of the configuration information of the current channel occupancy time window of the network device. The configuration information includes time configurations of the first time window, a second time window, and a third time window of the current channel occupancy time window of the network device, and a processing start moment of the terminal device in the current channel occupancy time window of the network device.

S402. The terminal device determines a second threshold and a third threshold.

The terminal device learns of the second threshold and the third threshold by receiving a broadcast message sent by the network device.

It should be noted that a sequence of S401 and S402 is not limited in this embodiment of the present disclosure.

Optionally, the terminal device learns of a first threshold by receiving a broadcast message sent by the network device. The first threshold is a maximum quantity of data packets allowed to be sent in the first time window, and is used by the terminal device to determine whether the terminal device meets a condition for sending a data packet to the network device.

The second threshold is a user attribute determining threshold, and is used by the terminal device to determine whether a user attribute of the terminal device is a center user or an edge user. The second threshold is a threshold of specified information. After learning of the second threshold of the specified information, the terminal device determines the user attribute of the terminal device based on the second threshold and a measurement result that is measured by the terminal device and that is consistent with the specified information. The specified information may include a coverage level or reference signal received power (RSRP). The terminal device may determine the user attribute of the terminal device in the following several methods.

Method 1: The specified information with the second threshold that is learned of by the terminal device by receiving the broadcast message of the network device is a coverage level, that is, the user attribute of the terminal device is a coverage level threshold of a center user, or the user attribute of the terminal device is a coverage level threshold of an edge user. After determining a coverage level of the terminal device through measurement, the terminal device determines, by comparing the coverage level of the terminal device with the coverage level threshold, whether the user attribute of the terminal device is a center user or an edge user. The terminal device may use a method in the prior art to determine the coverage level of the terminal device through measurement, and a specific method used by the terminal device to determine the coverage level of the terminal device through measurement is not limited in this embodiment of the present disclosure.

For example, a system is classified into three coverage levels based on a coverage distance of the network device. The three coverage levels are sequentially numbered CC0, CC1, and CC2, and are sequentially represented by using 2 binary bits: 00, 01, and 10. CC0 represents a coverage level with smallest coverage (highest received signal energy and a closest coverage distance), and CC2 represents a coverage level with largest coverage (lowest received signal energy and a farthest coverage distance). As shown in the following Table 1, a coverage level carried in the broadcast message of the network device indicates that the user attribute is the coverage level threshold of a center user, and the broadcast message of the network device may carry a coverage level number, or may carry a binary bit used to indicate a coverage level.

on the RSRP threshold. For example, the broadcast message further carries an offset Delta. If the RSRP of the terminal device is greater than or equal to a sum of the RSRP threshold and Delta, that is, the RSRP of the terminal device≥RSRP threshold+Delta, the terminal device determines that the user attribute of the terminal device is a center user; or if the RSRP of the terminal device is less than a sum of the RSRP threshold and Delta, that is, the RSRP of the terminal device<RSRP threshold+Delta, the terminal device determines that the user attribute of the terminal device is an edge user. Optionally, a few bits are used in the broadcast message to indicate a Delta value, namely, a Delta value of an enumeration type.

Method 3: The terminal device receives a synchronization sequence sent by the network device. The specified information, with the second threshold, carried in the synchronization sequence is a coverage level. That is, the user attribute, carried in the synchronization sequence, of the terminal device is a coverage level threshold of a center user, or the user attribute of the terminal device is a coverage level threshold of an edge user. After determining a coverage level of the terminal device through measurement, the terminal device determines, by comparing the coverage level of the terminal device with the coverage level threshold, whether the terminal device is a center user or an edge user. The terminal device may use a method in the prior art to determine the coverage level of the terminal device through measurement, and a specific method used by the terminal device to determine the coverage level of the terminal device through measurement is not limited in this embodiment of the present disclosure.

TABLE 1

Correspondence between a coverage level carried in a broadcast message and a meaning indicated by the coverage level

| Coverage level number | Binary bits used to indicate a coverage level | Corresponding meaning |
| --- | --- | --- |
| CC0 | 00 | A user attribute of a terminal device whose coverage level is CC0 is a center user, and a user attribute of another terminal devices is an edge user |
| CC1 | 01 | User attributes of terminal devices whose coverage levels are CC0 and CC1 are center users, and a user attribute of another terminal device is an edge user |
| CC2 | 10 | User attributes of terminal devices whose coverage levels are CC0, CC1, and CC2 are center users |
| Others | 11 | User attributes of terminal devices whose coverage levels are CC0, CC1, and CC2 are edge users |

Method 2: The specified information with the second threshold that is learned of by the terminal device by receiving the broadcast message of the network device is RSRP, that is, the user attribute of the terminal device is an RSRP threshold of a center user. After the terminal device determines RSRP of the terminal device through measurement, if the RSRP of the terminal device is greater than or equal to the RSRP threshold, the terminal device determines that the user attribute of the terminal device is a center user; or if the RSRP of terminal device is less than the RSRP threshold, the terminal device determines that the user attribute of the terminal device is an edge user.

Further, the broadcast message of the network device may further carry an offset and/or a compensation value, so as to improve reliability and stability of determining the user attribute of the terminal device by the terminal device based The synchronization sequence may carry a coverage level threshold in the following manners.

Manner 1: Different primary synchronization signals (PSS) are used to correspondingly indicate different coverage level thresholds.

Manner 2: Different secondary synchronization signals (SSS) are used to correspondingly indicate different coverage level thresholds.

Manner 3: Different SSS sequence combinations are used to correspondingly indicate different coverage level thresholds.

Manner 4: Different relative locations between a PSS and an SSS are used to correspondingly indicate different coverage level thresholds.

For example, when it is assumed that the system support coverage levels CC0 to CC23, and a coverage level threshold is CC1, that is, user attributes of terminal devices whose coverage levels are CC0 and CC1 are center users, and user attributes of terminal devices whose coverage levels are CC2 to CC23 are edge users, a corresponding relative location between a PSS and an SSS is as follows: the PSS is before the SSS, and the PSS and the SSS are separated by two timeslots. In this case, the network device selects CC1 as the coverage level threshold based on current load and interference, and the network device sends the PSS before the SSS in subsequent synchronization signal sending. The two signals are separated by two timeslots.

The third threshold is a data packet attribute determining threshold, and is used by the terminal device to determine whether a to-be-sent data packet is a large data packet or a small data packet. After learning of the third threshold, the terminal device determines an attribute of the to-be-sent data packet based on the third threshold and a size of the to-be-sent data packet. The third threshold may be an absolute data packet length L (unit: bit) or a ratio of a length of a buffer status report (BSR) to a data packet length.

S403. The terminal device determines whether the terminal device meets a data packet transmission condition.

The terminal device performs S404 if the terminal device determines that the terminal device does not meet the data packet transmission condition; or the terminal device performs S405 if the terminal device determines that the terminal device meets the data packet transmission condition.

Specifically, at the processing start moment of the terminal device in the current channel occupancy time window of the network device, when remaining duration of the current channel occupancy time window of the network device is greater than or equal to duration for the terminal device to transmit a to-be-sent data packet to the network device, the terminal device determines that the terminal device meets the data packet transmission condition; or when remaining duration of the current channel occupancy time window of the network device is less than duration for the terminal device to transmit a to-be-sent data packet to the network device, the terminal device determines that the terminal device does not meet the data packet transmission condition.

The terminal device may learn of the remaining duration of the current channel occupancy time window based on the processing start moment of the terminal device in the current channel occupancy time window and total duration of the current channel occupancy time window. The terminal device may determine a length of the to-be-sent data packet and a data packet transmission rate, so as to further determine the duration for the terminal device to transmit the to-be-sent data packet to the network device.

Optionally, if the terminal device determines, in S402, the first threshold by receiving the broadcast message of the network device, the terminal device may further determine, with reference to the first threshold, whether the terminal device meets the data packet transmission condition, and a specific method includes the following:

At the processing start moment of the terminal device in the current channel occupancy time window of the network device, when the remaining duration of the current channel occupancy time window of the network device is greater than or equal to the duration for the terminal device to transmit the to-be-sent data packet to the network device, if the terminal device determines that a quantity of data packets to be transmitted by the terminal device to the network device is less than or equal to the first threshold, the terminal device determines that the terminal device meets the data packet transmission condition; or if the terminal device determines that a quantity of data packets to be transmitted by the terminal device to the network device is greater than the first threshold, the terminal device determines that the terminal device does not meet the data packet transmission condition.

S404. The terminal device ends a current data packet transmission process.

When the terminal device determines in S403 that the terminal device does not meet the data packet transmission condition, and the terminal device has a data packet to be sent, the terminal device may determine, in a channel occupancy time window next to the current channel occupancy time window of the network device, whether the terminal device meets the data packet transmission condition, so as to send the data packet.

When the terminal device determines in S403 that the terminal device does not meet the data packet transmission condition, and the terminal device has no data packet to be sent, the terminal device ends the current procedure.

S405. The terminal device determines, based on the second threshold, whether a user attribute of the terminal device is a center user.

The terminal device performs S406 if the terminal device determines that the user attribute of the terminal device is a center user; or the terminal device performs S407 if the terminal device determines that the user attribute of the terminal device is an edge user.

For a method in which the terminal device determines the user attribute of the terminal device, refer to S402. Details are not described herein again.

S406. The terminal device determines, based on the third threshold, whether an attribute of a to-be-sent data packet is a small data packet.

The terminal device performs S407 if the terminal device determines that the attribute of the to-be-sent data packet is a small data packet; or the terminal device performs S408 if the terminal device determines that the attribute of the to-be-sent data packet is a large data packet.

For a method in which the terminal device determines the attribute of the to-be-sent data packet, refer to S402. Details are not described herein again.

S407. The terminal device selects a first transmission mode, and transmits the to-be-sent data packet to the network device in the first transmission mode.

To be specific, a terminal device corresponding to the first transmission mode needs to meet the following: A user attribute is an edge user, and an attribute of a to-be-sent data packet is a large data packet or a small data packet; or a user attribute is a center user, and an attribute of a to-be-sent data packet is a small data packet.

A method in which the terminal device transmits the to-be-sent data packet to the network device in the first transmission mode is as follows:

The terminal device transmits the to-be-sent data packet to the network device by using an available uplink channel in the third time window of the current channel occupancy time window of the network device. Further, the terminal device may transmit the to-be-sent data packet to the network device in a contention manner or a duty cycle manner.

For example, an uplink channel may be a physical uplink shared channel (PUSCH), and the terminal device may learn of the available uplink channel by receiving a broadcast message sent by the network device. When there is more than one available uplink channel, the terminal device may randomly select an uplink channel from all available uplink channels, to transmit the to-be-sent data packet to the network device.

Optionally, the method in which the terminal device transmits the to-be-sent data packet to the network device in the first transmission mode further includes the following:

In a second time window of the channel occupancy time window next to the current channel occupancy time window of the network device, the terminal device obtains, by monitoring a downlink channel, acknowledgement information fed back by the network device, and the acknowledgement information is used to indicate whether the network device successfully receives the to-be-sent data packet transmitted by the terminal device. For example, the acknowledgement information is an acknowledgement (ACK) or a negative acknowledgement (NACK).

For example, the downlink channel monitored by the terminal device may be a physical downlink control channel (PDCCH). The terminal device may monitor a downlink channel corresponding to the coverage level of the terminal device. The terminal device may learn of a correspondence between a coverage level and a downlink channel by receiving a broadcast message of the network device.

S408. The terminal device selects a second transmission mode, and transmits the to-be-sent data packet to the network device in the second transmission mode.

To be specific, a terminal device corresponding to the second transmission mode needs to meet the following: A user attribute is a center user and an attribute of a to-be-sent data packet is a large data packet.

The second transmission mode means that the terminal device transmits a data packet in a scheduling-based manner, so as to reduce mutual signal interference between different systems. A method in which the terminal device transmits the to-be-sent data packet to the network device in the second transmission mode is as follows:

Step 1: The terminal device sends a BSR to the network device by using an available uplink channel in the third time window of the current channel occupancy time window of the network device, and the BSR is used to request the network device to allocate a data packet transmission resource.

For example, an uplink channel may be a PUSCH, and the terminal device may learn of the available uplink channel by receiving a broadcast message sent by the network device. When there is more than one available uplink channel, the terminal device may randomly select an uplink channel from all available uplink channels, to send the BSR to the network device.

Step 2: In a second time window of the channel occupancy time window next to the current channel occupancy time window of the network device, the terminal device obtains, by monitoring a downlink channel, a data packet transmission resource allocated by the network device.

For example, the downlink channel monitored by the terminal device may be a PDCCH. The terminal device may monitor a downlink channel corresponding to the coverage level of the terminal device. The terminal device may learn of a correspondence between a coverage level and a downlink channel by receiving a broadcast message of the network device.

Specifically, when monitoring a downlink channel, if the terminal device detects a downlink channel identified by an identifier of the terminal device, e.g. random access-radio network temporary identifier (RA-RNTI), the terminal device parses uplink allocation information carried in the downlink channel, to learn of the data packet transmission resource.

Step 3: The terminal device transmits the to-be-sent data packet to the network device by using the data packet transmission resource allocated by the network device.

In step 3, optionally, if data packet transmission resources allocated by the network device a current time are insufficient for the terminal device to transmit the to-be-sent data packet to the network device, the terminal device may carry the BSR while sending the data packet to the network device, so as to prevent a problem that resources are wasted because the terminal device independently sends the BSR again to the network device, to request the network device to allocate a data packet transmission resource.

Optionally, the method further includes step 4:

After the terminal device transmits the to-be-sent data packet to the network device, the terminal device obtains, by monitoring a downlink channel, acknowledgement information fed back by the network device, and the acknowledgement information is used to indicate whether the network device successfully receives the to-be-sent data packet transmitted by the terminal device. For example, the acknowledgement information is an ACK or a NACK.

For example, the downlink channel monitored by the terminal device may be a PDCCH. The terminal device may monitor a downlink channel corresponding to the coverage level of the terminal device. The terminal device may learn of a correspondence between a coverage level and a downlink channel by receiving a broadcast message of the network device.

In this embodiment of the present disclosure, optionally, after the terminal device transmits the to-be-sent data packet, if the terminal device still has a data packet that needs to continue to be sent, the terminal device does not need to wait to receive the acknowledgement information fed back by the network device, and instead, the terminal device can continue to send the data packet to the network device in the third time window of the current channel occupancy time window of the network device, provided that remaining duration of the third time window of the current channel occupancy time window of the network device meets duration for continuing to send the data packet, and that a quantity of data packets to be sent by the terminal device is less than or equal to the first threshold. For a terminal device that selects the first transmission mode, the data packet mentioned in the method is a data packet sent by the terminal device to the network device. For a terminal device that selects the second transmission mode, the data packet mentioned in the method is a BSR sent by the terminal device to the network device.

Therefore, the terminal device obtains, by monitoring a downlink channel, the acknowledgement information fed back by the network device. The acknowledgement information may be used to indicate whether the network device successfully receives each data packet transmitted by the terminal device. To be specific, the network device feeds back, to a terminal device, receiving statuses of all data packets from the same terminal device by using one downlink channel, to reduce signaling overheads.

This embodiment of the present disclosure further provides a method for dynamically adjusting a first threshold by a network device. The first threshold is a quantity of maximum quantity of data packets allowed to be sent in the first time window. The network device dynamically adjusts the first threshold in real time, and notifies the terminal device of the first threshold by using a broadcast message.

The first threshold is used by the terminal device to determine whether the terminal device meets a condition for sending a data packet to the network device. When a quantity of data packets to be sent by the terminal device meets the first threshold, the terminal device may send a plurality of data packets to the network device, to increase an opportunity for sending a data packet by the terminal device. In addition, the network device feeds back, to a terminal device, receiving statuses of all data packets from the same terminal device by using one downlink channel, to reduce signaling overheads. Setting an excessively small first threshold is not conducive to resource utilization in the third time window, and setting an excessively large first threshold aggravates contention of the terminal device in the third time window, causing cache accumulation in the network device. Therefore, in this embodiment of the present disclosure, the network device sets and dynamically adjusts the first threshold based on a quantity of available uplink channel resources in the third time window and a processing capability of the network device. The processing capability of the network device includes a configuration of a downlink channel and a configuration of a data packet transmission resource (an uplink channel) in the second time window, and the like, so as to achieve load balance while ensuring resource utilization in the third time window.

In the technical solution provided in Embodiment 1, a mixed method based on contention and scheduling is used. The terminal device properly selects a data packet transmission mode based on the user attribute of the terminal device and a quantity of data packets to be transmitted, so as to more flexibly use an unlicensed spectrum, and effectively reduce mutual interference between different systems while meeting regulation constraints on use of the unlicensed spectrum.

Embodiment 2

In a method for data transmission in an unlicensed spectrum provided in this embodiment of the present disclosure, a terminal device selects, based on a user attribute of the terminal device, a transmission mode used to send a data packet to a network device, so as to implement data transmission between the terminal device and the network device in an unlicensed spectrum, and effectively reduce mutual interference between different systems while meeting regulation constraints on use of the unlicensed spectrum.

Figure 5:
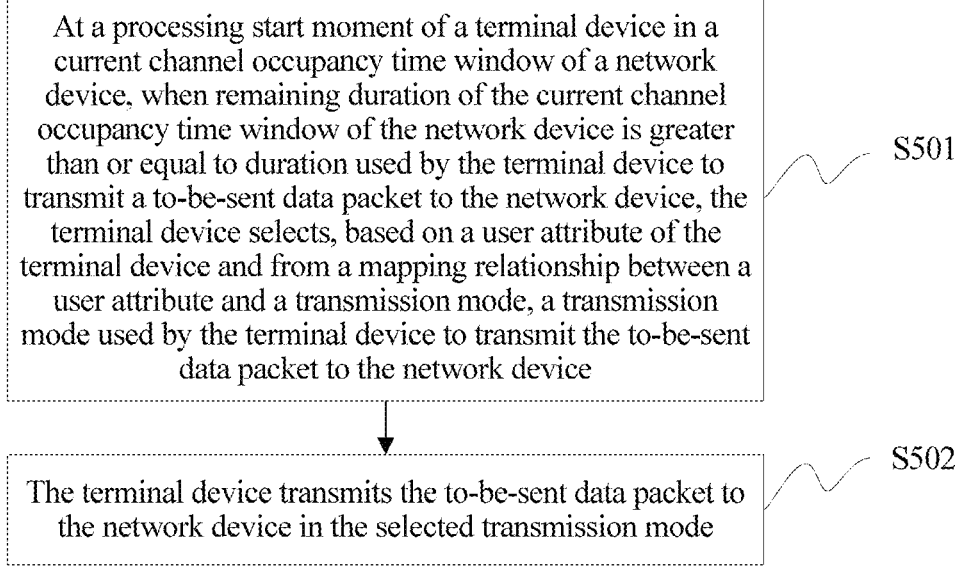
FIG. 5 is a schematic flowchart of a method for data transmission in an unlicensed spectrum according to an embodiment of the present disclosure.

As shown in FIG. 5, this embodiment of the present disclosure provides a method for data transmission in an unlicensed spectrum, and the method includes the following steps:

S501. At a processing start moment of a terminal device in a current channel occupancy time window of a network device, when remaining duration of the current channel occupancy time window of the network device is greater than or equal to duration for the terminal device to transmit a to-be-sent data packet to the network device, the terminal device selects, based on a user attribute of the terminal device and from a mapping relationship between a user attribute and a transmission mode, a transmission mode used by the terminal device to transmit the to-be-sent data packet to the network device.

The user attribute in the mapping relationship includes the user attribute of the terminal device, and the user attribute of the terminal device is a center user or an edge user.

S502. The terminal device transmits the to-be-sent data packet to the network device in the selected transmission mode.

In this embodiment of the present disclosure, an air-interface configuration of a radio frame in an unlicensed spectrum is shown in FIG. 3. The configuration in FIG. 3 includes a CCA time window and a channel occupancy time window. Each channel occupancy time window of the network device includes a first time window, a second time window, and a third time window, the first time window is used by the terminal device to perform system synchronization with the network device, and the second time window and the third time window are used by the terminal device to transmit a data packet to the network device in a selected transmission mode.

In Embodiment 2, for detailed content of the air-interface configuration, shown in FIG. 3, of the radio frame in the unlicensed spectrum, refer to content in Embodiment 1. Details are not described herein again.

Figure 6:
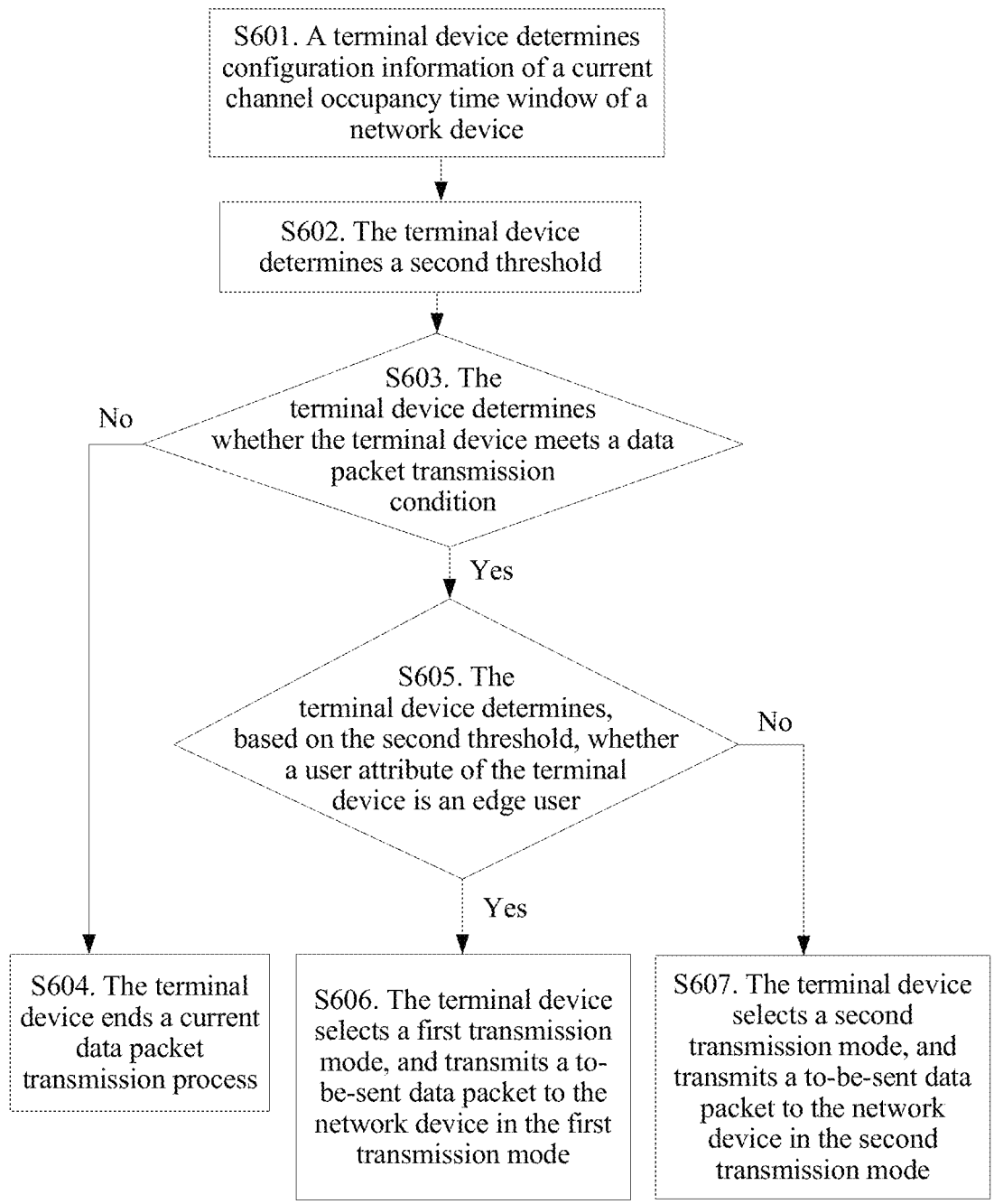
FIG. 6 is a schematic flowchart of a method for data transmission in an unlicensed spectrum according to an embodiment of the present disclosure.

With reference to FIG. 5 and FIG. 3, a procedure of the method for data transmission in an unlicensed spectrum provided in this embodiment of the present disclosure is shown in FIG. 6, includes the following steps.

S601. A terminal device determines configuration information of a current channel occupancy time window of a network device.

In a first time window of the current channel occupancy time window of the network device, the terminal device receives a synchronization signal sent by the network device, to learn of the configuration information of the current channel occupancy time window of the network device. The configuration information includes time configurations of the first time window, a second time window, and a third time window of the current channel occupancy time window of the network device, and a processing start moment of the terminal device in the current channel occupancy time window of the network device.

S602. The terminal device determines a second threshold.

The terminal device learns of the second threshold by receiving a broadcast message sent by the network device.

It should be noted that a sequence of S601 and S602 is not limited in this embodiment of the present disclosure.

Optionally, the terminal device learns of a first threshold by receiving a broadcast message sent by the network device. The first threshold is a maximum quantity of data packets allowed to be sent in the first time window, and is used by the terminal device to determine whether the terminal device meets a condition for sending a data packet to the network device.

The second threshold is a user attribute determining threshold, and is used by the terminal device to determine whether a user attribute of the terminal device is a center user or an edge user. The second threshold is a second threshold of specified information. After learning of the second threshold of the specified information, the terminal device determines the user attribute of the terminal device based on the second threshold and a measurement result that is measured by the terminal device and that is consistent with the specified information. The specified information may include a coverage level or RSRP.

In Embodiment 2, for a method in which the network device notifies the terminal device of the second threshold, and a method in which the terminal device determines the user attribute of the terminal device based on the second threshold, refer to content in Embodiment 1. Details are not described herein again.

S603. The terminal device determines whether the terminal device meets a data packet transmission condition.

The terminal device performs S604 if the terminal device determines that the terminal device does not meet the data packet transmission condition; or the terminal device performs S605 if the terminal device determines that the terminal device meets the data packet transmission condition.

Specifically, at the processing start moment of the terminal device in the current channel occupancy time window of the network device, when remaining duration of the current channel occupancy time window of the network device is greater than or equal to duration for the terminal device to transmit a to-be-sent data packet to the network device, the terminal device determines that the terminal device meets the data packet transmission condition; or when remaining duration of the current channel occupancy time window of the network device is less than duration for the terminal device to transmit a to-be-sent data packet to the network device, the terminal device determines that the terminal device does not meet the data packet transmission condition.

Optionally, if the terminal device determines, in S602, the first threshold by receiving the broadcast message of the network device, the terminal device may further determine, with reference to the first threshold, whether the terminal device meets the data packet transmission condition, and a specific method includes the following:

At the processing start moment of the terminal device in the current channel occupancy time window of the network device, when the remaining duration of the current channel occupancy time window of the network device is greater than or equal to the duration for the terminal device to transmit the to-be-sent data packet to the network device, if the terminal device determines that a quantity of data packets to be transmitted by the terminal device to the network device is less than or equal to the first threshold, the terminal device determines that the terminal device meets the data packet transmission condition; or if the terminal device determines that a quantity of data packets to be transmitted by the terminal device to the network device is greater than the first threshold, the terminal device determines that the terminal device does not meet the data packet transmission condition.

S604. The terminal device ends a current data packet transmission process.

When the terminal device determines in S603 that the terminal device does not meet the data packet transmission condition, and the terminal device has a data packet to be sent, the terminal device may determine, in a channel occupancy time window next to the current channel occupancy time window of the network device, whether the terminal device meets the data packet transmission condition, so as to send the data packet.

When the terminal device determines in S603 that the terminal device does not meet the data packet transmission condition, and the terminal device has no data packet to be sent, the terminal device ends the current procedure.

S605. The terminal device determines, based on the second threshold, whether a user attribute of the terminal device is an edge user.

The terminal device performs S606 if the terminal device determines that the user attribute of the terminal device is an edge user; or the terminal device performs S607 if the terminal device determines that the user attribute of the terminal device is a center user.

For a method in which the terminal device determines the user attribute of the terminal device, refer to S602. Details are not described herein again.

S606. The terminal device selects a first transmission mode, and transmits a to-be-sent data packet to the network device in the first transmission mode.

To be specific, a terminal device corresponding to the first transmission mode needs to meet the following: A user attribute is an edge user.

A method in which the terminal device transmits the to-be-sent data packet to the network device in the first transmission mode is as follows:

The terminal device transmits the to-be-sent data packet to the network device by using an available uplink channel in the third time window of the current channel occupancy time window of the network device. Further, the terminal device may transmit the to-be-sent data packet to the network device in a contention manner or a duty cycle manner.

For example, an uplink channel may be a PUSCH, and the terminal device may learn of the available uplink channel by receiving a broadcast message sent by the network device. When there is more than one available uplink channel, the terminal device may randomly select an uplink channel from all available uplink channels, to transmit the to-be-sent data packet to the network device.

Optionally, the method in which the terminal device transmits the to-be-sent data packet to the network device in the first transmission mode further includes the following:

In a second time window of the channel occupancy time window next to the current channel occupancy time window of the network device, the terminal device obtains, by monitoring a downlink channel, acknowledgement information fed back by the network device, and the acknowledgement information is used to indicate whether the network device successfully receives the to-be-sent data packet transmitted by the terminal device. For example, the acknowledgement information is an ACK or a NACK.

For example, the downlink channel monitored by the terminal device may be a PDCCH. The terminal device may monitor a downlink channel corresponding to a coverage level of the terminal device. The terminal device may learn of a correspondence between a coverage level and a downlink channel by receiving a broadcast message of the network device.

S607. The terminal device selects a second transmission mode, and transmits a to-be-sent data packet to the network device in the second transmission mode.

To be specific, a terminal device corresponding to the second transmission mode needs to meet the following: A user attribute is a center user.

A method in which the terminal device transmits the to-be-sent data packet to the network device in the second transmission mode is as follows:

Step 1: The terminal device sends a BSR to the network device by using an available uplink channel in the third time window of the current channel occupancy time window of the network device, and the BSR is used to request the network device to allocate a data packet transmission resource.

For example, an uplink channel may be a PUSCH, and the terminal device may learn of the available uplink channel by receiving a broadcast message sent by the network device. When there is more than one available uplink channel, the terminal device may randomly select an uplink channel from all available uplink channels, to send the BSR to the network device.

Step 2: In a second time window of the channel occupancy time window next to the current channel occupancy time window of the network device, the terminal device obtains, by monitoring a downlink channel, a data packet transmission resource allocated by the network device.

For example, the downlink channel monitored by the terminal device may be a PDCCH. The terminal device may monitor a downlink channel corresponding to a coverage level of the terminal device. The terminal device may learn of a correspondence between a coverage level and a downlink channel by receiving a broadcast message of the network device.

Specifically, when monitoring a downlink channel, if the terminal device detects a downlink channel identified by an identifier of the terminal device, the terminal device parses uplink allocation information carried in the downlink channel, to learn of the data packet transmission resource.

Step 3: The terminal device transmits the to-be-sent data packet to the network device by using the data packet transmission resource allocated by the network device.

In step 3, optionally, if data packet transmission resources allocated by the network device a current time are insufficient for the terminal device to transmit the to-be-sent data packet to the network device, the terminal device may carry the BSR while sending the data packet to the network device, so as to prevent a problem that resources are wasted because the terminal device independently sends the BSR again to the network device, to request the network device to allocate a data packet transmission resource.

Optionally, the method further includes step 4:

After the terminal device transmits the to-be-sent data packet to the network device, the terminal device obtains, by monitoring a downlink channel, acknowledgement information fed back by the network device, and the acknowledgement information is used to indicate whether the network device successfully receives the to-be-sent data packet transmitted by the terminal device. For example, the acknowledgement information is an ACK or a NACK.

For example, the downlink channel monitored by the terminal device may be a PDCCH. The terminal device may monitor a downlink channel corresponding to a coverage level of the terminal device. The terminal device may learn of a correspondence between a coverage level and a downlink channel by receiving a broadcast message of the network device.

In this embodiment of the present disclosure, optionally, after the terminal device transmits the to-be-sent data packet, if the terminal device still has a data packet that needs to continue to be sent, the terminal device does not need to wait to receive the acknowledgement information fed back by the network device, and instead, the terminal device can continue to send the data packet to the network device in the third time window of the current channel occupancy time window of the network device, provided that remaining duration of the third time window of the current channel occupancy time window of the network device meets duration for continuing to send the data packet, and that a quantity of data packets to be sent by the terminal device is less than or equal to the first threshold. For a terminal device that selects the first transmission mode, the data packet mentioned in the method is a data packet sent by the terminal device to the network device. For a terminal device that selects the second transmission mode, the data packet mentioned in the method is a BSR sent by the terminal device to the network device.

Therefore, the terminal device obtains, by monitoring a downlink channel, the acknowledgement information fed back by the network device. The acknowledgement information may be used to indicate whether the network device successfully receives each data packet transmitted by the terminal device. To be specific, the network device feeds back, to a terminal device, receiving statuses of all data packets from the same terminal device by using one downlink channel, to reduce signaling overheads.

This embodiment of the present disclosure further provides a method for dynamically adjusting a first threshold by a network device. The first threshold is a quantity of maximum quantity of data packets allowed to be sent in the first time window. The network device dynamically adjusts the first threshold in real time, and notifies the terminal device of the first threshold by using a broadcast message. The network device sets and dynamically adjusts the first threshold based on a quantity of available uplink channel resources in the third time window and a processing capability of the network device. The processing capability of the network device includes occupation of a downlink channel and an available resource in the second time window, and the like, so as to achieve load balance while ensuring resource utilization in the third time window.

In the technical solution provided in Embodiment 2, a mixed method based on contention and scheduling is used. The terminal device properly selects a data packet transmission mode based on the user attribute of the terminal device, so as to more flexibly use an unlicensed spectrum, and effectively reduce mutual interference between different systems while meeting regulation constraints on use of the unlicensed spectrum.

Embodiment 3

Figure 7:
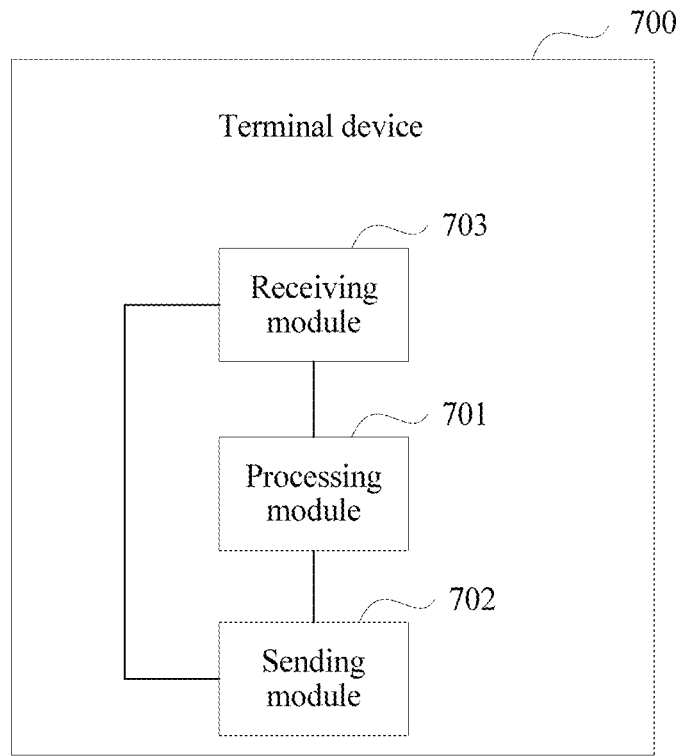
FIG. 7 is a schematic structural diagram of a terminal device according to an embodiment of the present disclosure.

FIG. 7 shows a terminal device provided in this embodiment of the present disclosure. The terminal device may use the method provided in the embodiment corresponding to FIG. 2. A terminal device 700 includes a processing module 701 and a sending module 702. Optionally, the terminal device 700 further includes a receiving module 703.

The processing module 701 is configured to: at a processing start moment of the terminal device in a current channel occupancy time window of a network device, when remaining duration of the current channel occupancy time window of the network device is greater than or equal to duration for the sending module 702 of the terminal device to transmit a to-be-sent data packet to the network device, select, based on a user attribute of the terminal device and an attribute of the to-be-sent data packet and from a mapping relationship between a user attribute, a data packet attribute, and a transmission mode, a transmission mode used by the sending module 702 to transmit the to-be-sent data packet to the network device.

The user attribute in the mapping relationship includes the user attribute of the terminal device, and the user attribute of the terminal device is a center user or an edge user. The data packet attribute in the mapping relationship includes the attribute of the to-be-sent data packet, and the attribute of the to-be-sent data packet is a large data packet or a small data packet.

The sending module 702 is configured to transmit the to-be-sent data packet to the network device in the transmission mode selected by the processing module 701.

Optionally, each channel occupancy time window of the network device includes a first time window and a third time window, the first time window is used by the processing module 701 to control the terminal device to perform system synchronization with the network device, and the third time window is used by the sending module 702 to transmit a data packet to the network device in a transmission mode selected by the processing module 701; or each channel occupancy time window of the network device includes a first time window, a second time window, and a third time window, the first time window is used by the processing module 701 to control the terminal device to perform system synchronization with the network device, and the second time window and the third time window are used by the sending module 702 to transmit a data packet to the network device in a transmission mode selected by the processing module 701.

The terminal device performs system synchronization with the network device in the first time window, so that the terminal device learns of configuration information of the current channel occupancy time window of the network device through system synchronization.

Optionally, when each channel occupancy time window of the network device includes a first time window and a third time window, the mapping relationship includes:

for a terminal device whose user attribute is an edge user and whose to-be-sent data packet has an attribute of a large data packet or a small data packet, a transmission mode selected by the processing module 701 included in the terminal device is a first transmission mode; or for a terminal device whose user attribute is a center user and whose to-be-sent data packet has an attribute of a small data packet, a transmission mode selected by the processing module 701 included in the terminal device is a first transmission mode.

When transmitting the to-be-sent data packet to the network device in the transmission mode selected by the processing module 701, the sending module 702 is specifically configured to:

transmit the to-be-sent data packet to the network device by using an available uplink channel in a third time window of the current channel occupancy time window of the network device.

The terminal device that selects the first transmission mode may send the to-be-sent data packet to the network device in a contention manner or a low duty cycle manner, so as to stagger processes of sending data packets by terminal devices, thereby effectively reducing mutual signal interference between different systems.

Optionally, the terminal device further includes:

a receiving module 703, configured to: in a second time window of a channel occupancy time window next to the current channel occupancy time window of the network device, receive, by monitoring a downlink channel, acknowledgement information fed back by the network device, where the acknowledgement information is used to indicate whether the network device successfully receives the to-be-sent data packet transmitted by the sending module 702.

Optionally, when each channel occupancy time window of the network device includes a first time window, a second time window, and a third time window, the mapping relationship includes:

for a terminal device whose user attribute is a center user and whose to-be-sent data packet has an attribute of a large data packet, a transmission mode selected by the processing module 701 included in the terminal device is a second transmission mode.

Before transmitting the to-be-sent data packet to the network device, the sending module 702 is further configured to:

send a buffer status report (BSR) to the network device by using an available uplink channel in a third time window of the current channel occupancy time window of the network device, where the BSR is used to request the network device to allocate a data packet transmission resource.

The terminal device further includes:

a receiving module 703, configured to: in a second time window of a channel occupancy time window next to the current channel occupancy time window of the network device, receive, by monitoring a downlink channel, a data packet transmission resource allocated by the network device.

When transmitting the to-be-sent data packet to the network device, the sending module 702 is specifically configured to:

transmit the to-be-sent data packet to the network device by using the data packet transmission resource that is allocated by the network device and that is received by the receiving module 703.

The terminal device that selects the second transmission mode sends the data packet to the network device in a scheduling-based transmission mode, so as to effectively reduce mutual signal interference between different systems.

Optionally, because the to-be-sent data packet of the terminal device that selects the second transmission mode has the attribute of a large data packet, if data packet transmission resources allocated by the network device a current time are insufficient for the terminal device to transmit the to-be-sent data packet to the network device, the sending module 702 of the terminal device may carry the BSR while sending the data packet to the network device, so as to prevent a problem that resources are wasted because the sending module 702 of the terminal device independently sends the BSR again to the network device, to request the network device to allocate a data packet transmission resource.

Optionally, the receiving module 703 is further configured to:

after the sending module 702 transmits the to-be-sent data packet to the network device, receive, by monitoring a downlink channel, acknowledgement information fed back by the network device, where the acknowledgement information is used to indicate whether the network device successfully receives the to-be-sent data packet transmitted by the terminal device.

Optionally, before selecting the transmission mode used by the sending module 702 to transmit the to-be-sent data packet to the network device, the processing module 701 is further configured to:

determine that a quantity of data packets to be transmitted by the sending module 702 to the network device is less than or equal to a first threshold.

Optionally, after the sending module 702 transmits the to-be-sent data packet to the network device, if the terminal device still has a data packet that needs to continue to be sent, the sending module 702 does not need to wait to receive the acknowledgement information fed back by the network device, and instead, the sending module 702 can continue to send the data packet to the network device in the third time window of the current channel occupancy time window of the network device, provided that the processing module 701 determines that remaining duration of the third time window of the current channel occupancy time window of the network device meets duration for continuing to send the data packet, and that a quantity of data packets to be sent by the sending module 702 is less than or equal to the first threshold.

Optionally, the receiving module 703 obtains, by monitoring a downlink channel, the acknowledgement information fed back by the network device. The acknowledgement information may be further used to indicate whether the network device successfully receives each data packet transmitted by the terminal device. To be specific, the network device feeds back, to a terminal device, receiving statuses of all data packets from the same terminal device by using one downlink channel, to reduce signaling overheads.

The network device sets and dynamically adjusts the first threshold based on a quantity of available uplink channel resources in the third time window and a processing capability of the network device. The processing capability of the network device includes a configuration of a downlink channel and a configuration of a data packet transmission resource (an uplink channel) in the second time window, and the like, so as to achieve load balance while ensuring resource utilization in the third time window.

Optionally, before selecting the transmission mode used by the sending module 702 to transmit the to-be-sent data packet to the network device, the processing module 701 is further configured to:

determine a second threshold of specified information, where the second threshold is used to determine whether the user attribute of the terminal device is a center user or an edge user, and the specified information includes a coverage level or reference signal received power (RSRP); and determine the user attribute of the terminal device based on the second threshold and a measurement result that is measured by the terminal device and that is consistent with the specified information.

Optionally, before selecting the transmission mode used by the sending module 702 to transmit the to-be-sent data packet to the network device, the processing module 701 is further configured to:

determine a third threshold, where the third threshold is used to determine whether the attribute of the to-be-sent data packet is a large data packet or a small data packet; and determine the attribute of the to-be-sent data packet based on the third threshold and a size of the to-be-sent data packet.

It should be noted that the unit division in the embodiments of the present disclosure is an example and is only logical function division, and may be another division manner in actual implementation. In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The storage medium includes any medium that can store program code, such as a Universal Serial Bus (USB) flash drive, a removable hard disk, a read-only memory (ROM), a random access memory (RAM), a magnetic disk, or an optical disc.

Figure 8:
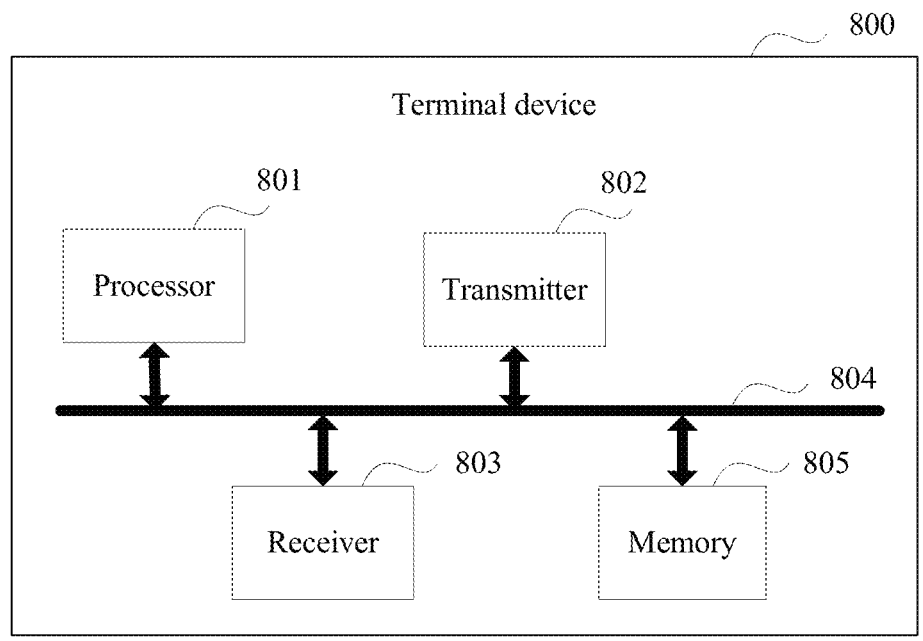
FIG. 8 is a schematic structural diagram of a terminal device according to an embodiment of the present disclosure.

Based on the foregoing embodiment, an embodiment of the present disclosure further provides a terminal device. The terminal device may use the method provided in the embodiment corresponding to FIG. 2, and may be a device same as the terminal device shown in FIG. 7. Referring to FIG. 8, a terminal device 800 includes a processor 801, a transmitter 802, a receiver 803, a bus 804, and a memory 805.

The processor 801, the transmitter 802, the receiver 803, and the memory 805 are connected to each other by using the bus 804. The bus 804 may be a peripheral component interconnect (PCI) bus, an extended industry standard architecture (EISA) bus, or the like. The bus may be classified into an address bus, a data bus, a control bus, and the like. For ease of representation, only one bold line is used in FIG. 8 to represent the bus, but it does not indicate that there is only one bus or one type of bus.

The processor 801 in FIG. 8 is corresponding to the processing module 701 in FIG. 7, the transmitter 802 in FIG. 8 is corresponding to the sending module 702 in FIG. 7, and the receiver 803 in FIG. 8 is corresponding to the receiving module 703 in FIG. 7. The terminal device 800 further includes the memory 805, configured to store a program and the like. Specifically, the program may include program code, and the program code includes a computer operation instruction. The memory 805 may include a random access memory (RAM), and may further include a nonvolatile memory, for example, at least one magnetic disk storage. The processor 801 executes the application program stored in the memory 805, to implement the foregoing method for data transmission in an unlicensed spectrum.

Embodiment 4

Figure 9:
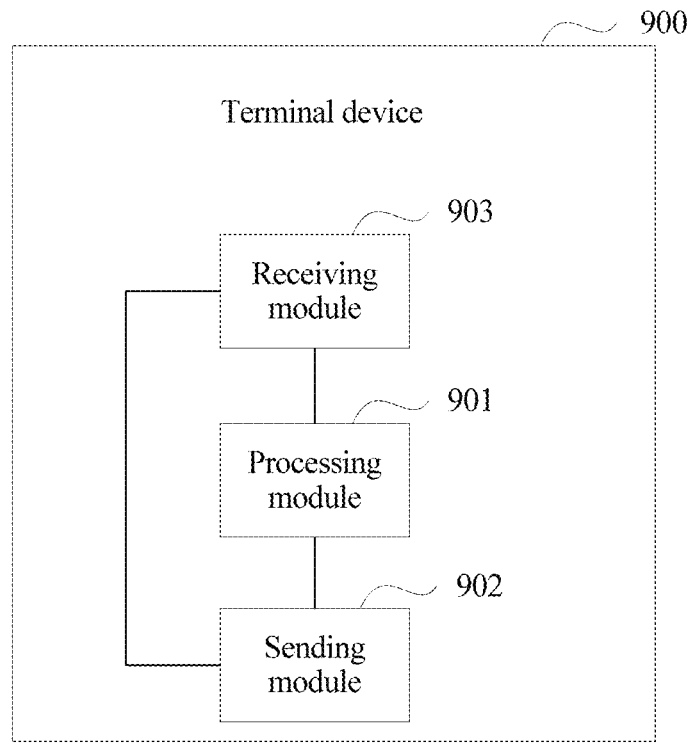
FIG. 9 is a schematic structural diagram of a terminal device according to an embodiment of the present disclosure.

Based on Embodiment 2, this embodiment of the present disclosure further provides a terminal device. The terminal device may use the method provided in the embodiment corresponding to FIG. 5. Referring to FIG. 9, a terminal device 900 includes a processing module 901 and a sending module 902. Optionally, the terminal device 900 further includes a receiving module 903.

The processing module 901 is configured to: at a processing start moment of the terminal device in a current channel occupancy time window of a network device, when remaining duration of the current channel occupancy time window of the network device is greater than or equal to duration for the sending module 902 of the terminal device to transmit a to-be-sent data packet to the network device, select, based on a user attribute of the terminal device and from a mapping relationship between a user attribute and a transmission mode, a transmission mode used by the sending module 902 to transmit the to-be-sent data packet to the network device.

The user attribute in the mapping relationship includes the user attribute of the terminal device, and the user attribute of the terminal device is a center user or an edge user.

The sending module 902 is configured to transmit the to-be-sent data packet to the network device in the transmission mode selected by the processing module 901.

Optionally, each channel occupancy time window of the network device includes a first time window and a third time window, the first time window is used by the processing module 901 to control the terminal device to perform system synchronization with the network device, and the third time window is used by the sending module 902 to transmit a data packet to the network device in a transmission mode selected by the processing module 901; or each channel occupancy time window of the network device includes a first time window, a second time window, and a third time window, the first time window is used by the processing module 901 to control the terminal device to perform system synchronization with the network device, and the second time window and the third time window are used by the sending module 902 to transmit a data packet to the network device in a transmission mode selected by the processing module 901.

Optionally, when each channel occupancy time window of the network device includes a first time window and a third time window, the mapping relationship includes:

for a terminal device whose user attribute is an edge user, a transmission mode selected by the processing module 901 included in the terminal device is a first transmission mode.

When transmitting the to-be-sent data packet to the network device in the transmission mode selected by the processing module 901, the sending module 902 is specifically configured to:

transmit the to-be-sent data packet to the network device by using an available uplink channel in a third time window of the current channel occupancy time window of the network device.

Optionally, the terminal device further includes:

a receiving module 903, configured to: in a second time window of a channel occupancy time window next to the current channel occupancy time window of the network device, receive, by monitoring a downlink channel, acknowledgement information fed back by the network device, where the acknowledgement information is used to indicate whether the network device successfully receives the to-be-sent data packet transmitted by the sending module 902.

Optionally, when each channel occupancy time window of the network device includes a first time window, a second time window, and a third time window, the mapping relationship includes:

for a terminal device whose user attribute is a center user, a transmission mode selected by the processing module 901 included in the terminal device is a second transmission mode.

Before transmitting the to-be-sent data packet to the network device, the sending module 902 is further configured to:

send a buffer status report (BSR) to the network device by using an available uplink channel in a third time window of the current channel occupancy time window of the network device, where the BSR is used to request the network device to allocate a data packet transmission resource.

The terminal device further includes:

a receiving module 903, configured to: in a second time window of a channel occupancy time window next to the current channel occupancy time window of the network device, receive, by monitoring a physical downlink channel, a data packet transmission resource allocated by the network device.

When transmitting the to-be-sent data packet to the network device, the sending module 902 is specifically configured to:

transmit the to-be-sent data packet to the network device by using the data packet transmission resource that is allocated by the network device and that is received by the receiving module 903.

Optionally, the receiving module 903 is further configured to:

after the sending module 902 transmits the to-be-sent data packet to the network device, receive, by monitoring a downlink channel, acknowledgement information fed back by the network device, where the acknowledgement information is used to indicate whether the network device successfully receives the to-be-sent data packet transmitted by the sending module 902.

Optionally, before selecting the transmission mode used by the sending module 902 to transmit the to-be-sent data packet to the network device, the processing module 901 is further configured to:

determine that a quantity of data packets to be transmitted by the terminal device to the network device is less than or equal to a first threshold.

Optionally, before selecting the transmission mode used by the sending module 902 to transmit the to-be-sent data packet to the network device, the processing module 901 is further configured to:

determine a second threshold of specified information, where the second threshold is used to determine whether the user attribute of the terminal device is a center user or an edge user, and the specified information includes a coverage level or reference signal received power (RSRP); and determine the user attribute of the terminal device based on the second threshold and a measurement result that is measured by the terminal device and that is consistent with the specified information.

Figure 10:
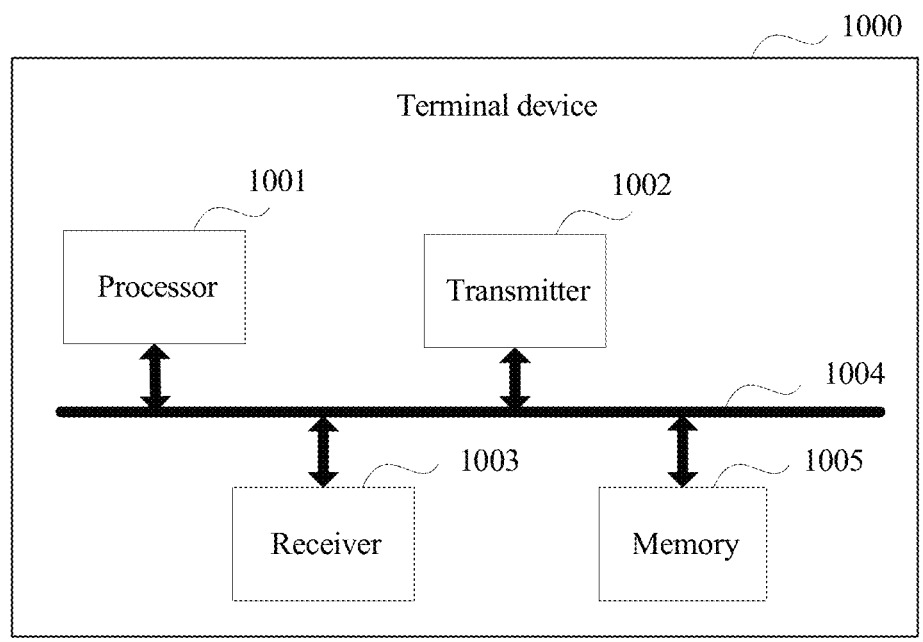
FIG. 10 is a schematic structural diagram of a terminal device according to an embodiment of the present disclosure.

Based on the foregoing embodiment, an embodiment of the present disclosure further provides a terminal device. The terminal device may use the method provided in the embodiment corresponding to FIG. 5, and may be a device same as the terminal device shown in FIG. 9. Referring to FIG. 10, a terminal device 1000 includes a processor 1001, a transmitter 1002, a receiver 1003, a bus 1004, and a memory 1005.

The processor 1001, the transmitter 1002, the receiver 1003, and the memory 1005 are connected to each other by using the bus 1004. The bus 1004 may be a PCI bus, an EISA bus, or the like. The bus may be classified into an address bus, a data bus, a control bus, and the like. For ease of representation, only one bold line is used in FIG. 10 to represent the bus, but it does not indicate that there is only one bus or one type of bus.

The processor 1001 in FIG. 10 is corresponding to the processing module 901 in FIG. 9, the transmitter 1002 in FIG. 10 is corresponding to the sending module 902 in FIG. 9, and the receiver 1003 in FIG. 10 is corresponding to the receiving module 903 in FIG. 9. The terminal device 1000 further includes the memory 1005, configured to store a program and the like. Specifically, the program may include program code, and the program code includes a computer operation instruction. The memory 1005 may include a RAM, and may further include a nonvolatile memory, for example, at least one magnetic disk storage. The processor 1001 executes the application program stored in the memory 1005, to implement the foregoing method for data transmission in an unlicensed spectrum.

Embodiment 5

Figure 11:
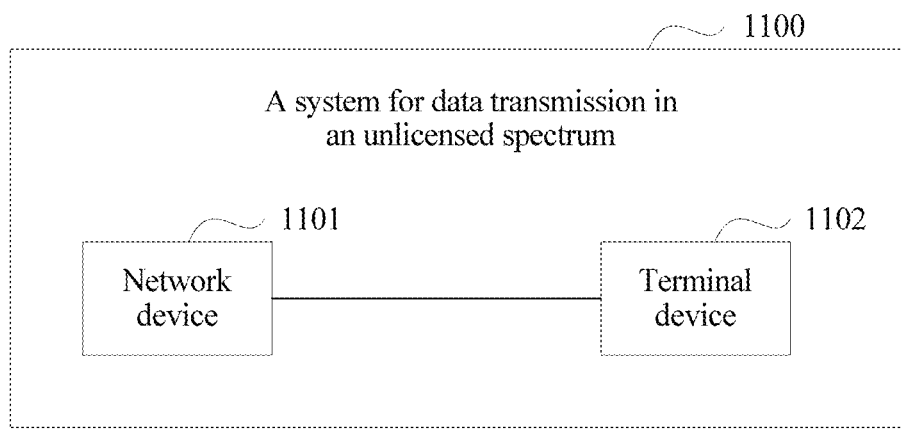
FIG. 11 is a schematic structural diagram of a system for data transmission in an unlicensed spectrum according to an embodiment of the present disclosure.

Based on Embodiment 1 and Embodiment 3, this embodiment of the present disclosure provides a system for data transmission in an unlicensed spectrum. Referring to FIG. 11, a system 1100 includes a network device 1101 and a terminal device 1102.

The network device 1101 is configured to: determine downlink information, where the downlink information includes a current channel occupancy time window of the network device 1101, a processing start moment of the terminal device 1102 in the current channel occupancy time window, and a mapping relationship between a user attribute, a data packet attribute, and a transmission mode, where the user attribute in the mapping relationship includes a center user and an edge user, and the data packet attribute in the mapping relationship includes a large data packet and a small data packet; and send the downlink information to the terminal device 1102.

The terminal device 1102 is configured to: receive the downlink information delivered by the network device 1101; and at the processing start moment of the terminal device 1102 in the current channel occupancy time window of the network device 1101, when remaining duration of the current channel occupancy time window of the network device 1101 is greater than or equal to duration for the terminal device 1102 to transmit a to-be-sent data packet to the network device 1101, select, from the mapping relationship and based on the downlink information, a user attribute of the terminal device 1102 and an attribute of the to-be-sent data packet, a transmission mode used by the terminal device 1102 to transmit the to-be-sent data packet to the network device 1101, where the user attribute in the mapping relationship includes the user attribute of the terminal device 1102, and the data packet attribute in the mapping relationship includes the attribute of the to-be-sent data packet; and transmit the to-be-sent data packet to the network device 1101 in the selected transmission mode.

Optionally, each channel occupancy time window of the network device 1101 includes a first time window and a third time window, the first time window is used by the terminal device 1102 to perform system synchronization with the network device 1101, and the third time window is used by the terminal device 1102 to transmit a data packet to the network device 1101 in a selected transmission mode; or each channel occupancy time window of the network device 1101 includes a first time window, a second time window, and a third time window, the first time window is used by the terminal device 1102 to perform system synchronization with the network device 1101, and the second time window and the third time window are used by the terminal device 1102 to transmit a data packet to the network device 1101 in a selected transmission mode.

Optionally, when each channel occupancy time window of the network device 1101 includes a first time window and a third time window, the mapping relationship includes:

a transmission mode selected by a terminal device 1102 whose user attribute is an edge user and whose to-be-sent data packet has an attribute of a large data packet or a small data packet is a first transmission mode, or a transmission mode selected by a terminal device 1102 whose user attribute is a center user and whose to-be-sent data packet has an attribute of a small data packet is a first transmission mode.

The first transmission mode includes the following: The terminal device 1102 transmits the to-be-sent data packet to the network device 1101 by using an available uplink channel in a third time window of the current channel occupancy time window of the network device 1101.

Optionally, when each channel occupancy time window of the network device 1101 further includes a second time window, the first transmission mode further includes the following:

In a second time window of a channel occupancy time window next to the current channel occupancy time window of the network device 1101, the terminal device 1102 receives, by monitoring a downlink channel, acknowledgement information fed back by the network device 1101, where the acknowledgement information is used to indicate whether the network device 1101 successfully receives the to-be-sent data packet transmitted by the terminal device 1102.

Optionally, when each channel occupancy time window of the network device 1101 includes a first time window, a second time window, and a third time window, the mapping relationship includes:

a transmission mode selected by a terminal device 1102 whose user attribute is a center user and whose to-be-sent data packet has an attribute of a large data packet is a second transmission mode, where the second transmission mode includes the following:

The terminal device 1102 sends a buffer status report (BSR) to the network device 1101 by using an available uplink channel in a third time window of the current channel occupancy time window of the network device 1101, where the BSR is used to request the network device 1101 to allocate a data packet transmission resource;

in a second time window of a channel occupancy time window next to the current channel occupancy time window of the network device 1101, the terminal device 1102 obtains, by monitoring a downlink channel, a data packet transmission resource allocated by the network device 1101; and the terminal device 1102 transmits the to-be-sent data packet to the network device 1101 by using the data packet transmission resource allocated by the network device 1101.

Optionally, the second transmission mode further includes the following:

After the terminal device 1102 transmits the to-be-sent data packet to the network device 1101, the terminal device 1102 receives, by monitoring a downlink channel, acknowledgement information fed back by the network device 1101, where the acknowledgement information is used to indicate whether the network device 1101 successfully receives the to-be-sent data packet transmitted by the terminal device 1102.

Optionally, the downlink information further includes a first threshold.

Before selecting the transmission mode used by the terminal device 1102 to transmit the to-be-sent data packet to the network device 1101, the terminal device 1102 is further configured to:

determine that a quantity of data packets to be transmitted by the terminal device 1102 to the network device 1101 is less than or equal to the first threshold.

Optionally, the downlink information further includes a second threshold of specified information, and the specified information includes a coverage level or reference signal received power (RSRP).

Before selecting the transmission mode used by the terminal device 1102 to transmit the to-be-sent data packet to the network device 1101, the terminal device 1102 is further configured to:

determine, based on the second threshold and a measurement result that is measured by the terminal device 1102 and that is consistent with the specified information, whether the user attribute of the terminal device 1102 is a center user or an edge user.

Optionally, the downlink information further includes a third threshold.

Before selecting the transmission mode used by the terminal device 1102 to transmit the to-be-sent data packet to the network device 1101, the terminal device 1102 is further configured to:

determine, based on the third threshold and a size of the to-be-sent data packet, whether the attribute of the to-be-sent data packet is a large data packet or a small data packet.

Embodiment 6

Figure 12:
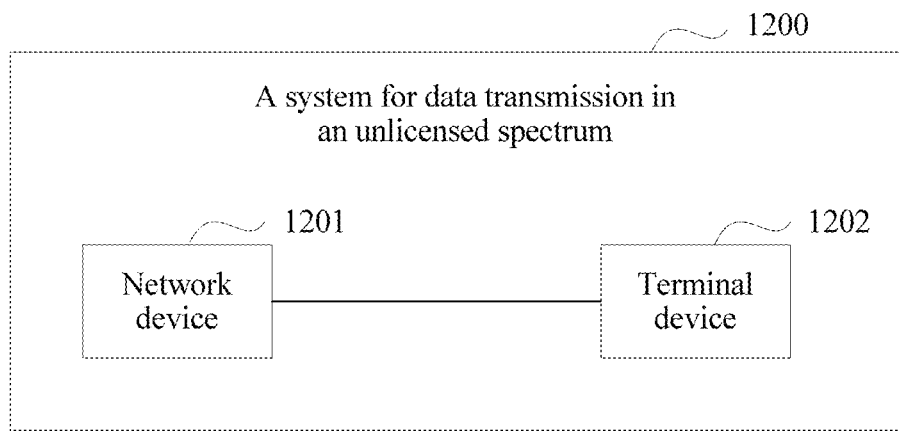
FIG. 12 is a schematic structural diagram of a system for data transmission in an unlicensed spectrum according to an embodiment of the present disclosure.

Based on Embodiment 2 and Embodiment 4, this embodiment of the present disclosure provides a system for data transmission in an unlicensed spectrum. Referring to FIG. 12, a system 1200 includes a network device 1201 and a terminal device 1202.

The network device 1201 is configured to: determine downlink information, where the downlink information includes a current channel occupancy time window of the network device 1201, a processing start moment of the terminal device 1202 in the current channel occupancy time window, and a mapping relationship between a user attribute and a transmission mode, where the user attribute in the mapping relationship includes a center user and an edge user; and send the downlink information to the terminal device 1202.

The terminal device 1202 is configured to: receive the downlink information delivered by the network device 1201; and at the processing start moment of the terminal device 1202 in the current channel occupancy time window of the network device 1201, when remaining duration of the current channel occupancy time window of the network device 1201 is greater than or equal to duration for the terminal device 1202 to transmit a to-be-sent data packet to the network device 1201, select, from the mapping relationship and based on the downlink information and a user attribute of the terminal device 1202, a transmission mode used by the terminal device 1202 to transmit the to-be-sent data packet to the network device 1201, where the user attribute in the mapping relationship includes the user attribute of the terminal device 1202; and transmit the to-be-sent data packet to the network device 1201 in the selected transmission mode.

Optionally, each channel occupancy time window of the network device 1201 includes a first time window and a third time window, the first time window is used by the terminal device 1202 to perform system synchronization with the network device 1201, and the third time window is used by the terminal device 1202 to transmit a data packet to the network device 1201 in a selected transmission mode; or each channel occupancy time window of the network device 1201 includes a first time window, a second time window, and a third time window, the first time window is used by the terminal device 1202 to perform system synchronization with the network device 1201, and the second time window and the third time window are used by the terminal device 1202 to transmit a data packet to the network device 1201 in a selected transmission mode.

Optionally, when each channel occupancy time window of the network device 1201 includes a first time window and a third time window, the mapping relationship includes:

a transmission mode selected by a terminal device 1202 whose user attribute is an edge user is a first transmission mode.

The first transmission mode includes the following: The terminal device 1202 transmits the to-be-sent data packet to the network device 1201 by using an available uplink channel in a third time window of the current channel occupancy time window of the network device 1201.

Optionally, when each channel occupancy time window of the network device 1201 further includes a second time window, the first transmission mode further includes the following:

In a second time window of a channel occupancy time window next to the current channel occupancy time window of the network device 1201, the terminal device 1202 obtains, by monitoring a downlink channel, acknowledgement information fed back by the network device 1201, where the acknowledgement information is used to indicate whether the network device 1201 successfully receives the to-be-sent data packet transmitted by the terminal device 1202.

Optionally, when each channel occupancy time window of the network device 1201 includes a first time window, a second time window, and a third time window, the mapping relationship includes:

a transmission mode selected by a terminal device 1202 whose user attribute is a center user is a second transmission mode, where the second transmission mode includes the following:

The terminal device 1202 sends a buffer status report BSR to the network device 1201 by using an available uplink channel in a third time window of the current channel occupancy time window of the network device 1201, where the BSR is used to request the network device 1201 to allocate a data packet transmission resource;

in a second time window of a channel occupancy time window next to the current channel occupancy time window of the network device 1201, the terminal device 1202 obtains, by monitoring a physical downlink channel, a data packet transmission resource allocated by the network device 1201; and the terminal device 1202 transmits the to-be-sent data packet to the network device 1201 by using the data packet transmission resource allocated by the network device 1201.

Optionally, the second transmission mode further includes the following:

After the terminal device 1202 transmits the to-be-sent data packet to the network device 1201, the terminal device 1202 obtains, by monitoring a downlink channel, acknowledgement information fed back by the network device 1201, where the acknowledgement information is used to indicate whether the network device 1201 successfully receives the to-be-sent data packet transmitted by the terminal device 1202.

Optionally, the downlink information further includes a first threshold.

Before selecting the transmission mode used by the terminal device 1202 to transmit the to-be-sent data packet to the network device 1201, the terminal device 1202 is further configured to:

determine that a quantity of data packets to be transmitted by the terminal device 1202 to the network device 1201 is less than or equal to the first threshold.

Optionally, the downlink information further includes a second threshold of specified information, and the specified information includes a coverage level or reference signal received power (RSRP).

Before selecting the transmission mode used by the terminal device 1202 to transmit the to-be-sent data packet to the network device 1201, the terminal device 1202 is further configured to:

determine, based on the second threshold and a measurement result that is measured by the terminal device 1202 and that is consistent with the specified information, whether the user attribute of the terminal device 1202 is a center user or an edge user.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method for data transmission in an unlicensed spectrum, comprising:
at a processing start moment of a terminal device in a current channel occupancy time window of a network device, when remaining duration of the current channel occupancy time window of the network device is greater than or equal to duration for the terminal device to transmit a to-be-sent data packet to the network device, selecting, by the terminal device, based on a user attribute of the terminal device and from a mapping relationship between the user attribute and a transmission mode, the transmission mode used by the terminal device to transmit the to-be-sent data packet to the network device, wherein, before the selecting, by the terminal device, the transmission mode used by the terminal device to transmit the to-be-sent data packet to the network device, obtaining, by the terminal device, a second threshold of specified information from the network device, wherein the second threshold is used to determine whether the user attribute of the terminal device is a center user or an edge user, and the specified information comprises a coverage level or reference signal received power (RSRP), and, determining, by the terminal device, the user attribute of the terminal device based on the second threshold, wherein,
the user attribute in the mapping relationship comprises the user attribute of the terminal device, and the user attribute of the terminal device is the center user or the edge user; and
transmitting, by the terminal device, the to-be-sent data packet to the network device in the selected transmission mode.

2. The method according to claim 1, wherein each channel occupancy time window of the network device comprises a first time window and a third time window, the first time window is used by the terminal device to perform system synchronization with the network device, and the third time window is used by the terminal device to transmit a data packet to the network device in a selected transmission mode; or
each channel occupancy time window of the network device comprises a first time window, a second time window, and a third time window, the first time window is used by the terminal device to perform system synchronization with the network device, and the second time window and the third time window are used by the terminal device to transmit a data packet to the network device in a selected transmission mode.

3. The method according to claim 2, wherein when each channel occupancy time window of the network device comprises the first time window and the third time window, the mapping relationship comprises:
a transmission mode selected by a terminal device whose user attribute is an edge user is a first transmission mode, wherein
the first transmission mode comprises: transmitting, by the terminal device, the to-be-sent data packet to the network device by using an available uplink channel in the third time window of the current channel occupancy time window of the network device.

4. The method according to claim 3, wherein when each channel occupancy time window of the network device further comprises a second time window, the first transmission mode further comprises:
in the second time window of a channel occupancy time window next to the current channel occupancy time window of the network device, obtaining, by the terminal device by monitoring a downlink channel, acknowledgement information fed back by the network device, wherein the acknowledgement information is used to indicate whether the network device successfully receives the to-be-sent data packet transmitted by the terminal device.

5. The method according to claim 2, wherein when each channel occupancy time window of the network device comprises the first time window, the second time window, and the third time window, the mapping relationship comprises:
a transmission mode selected by a terminal device whose user attribute is a center user is a second transmission mode, wherein the second transmission mode comprises:
sending, by the terminal device, a buffer status report (BSR) to the network device by using an available uplink channel in the third time window of the current channel occupancy time window of the network device, wherein the BSR is used to request the network device to allocate a data packet transmission resource;
in the second time window of the channel occupancy time window next to the current channel occupancy time window of the network device, obtaining, by the terminal device by monitoring a physical downlink channel, a data packet transmission resource allocated by the network device; and
transmitting, by the terminal device, the to-be-sent data packet to the network device by using the data packet transmission resource allocated by the network device.

6. The method according to claim 1, before the selecting, by the terminal device, a transmission mode used by the terminal device to transmit the to-be-sent data packet to the network device, further comprising:
determining, by the terminal device, that a quantity of data packets to be transmitted by the terminal device to the network device is less than or equal to a first threshold.

7. The method according to claim 1,
wherein the user attribute of the terminal device is determined based on the second threshold and a measurement result that is measured by the terminal device and that is consistent with the specified information.

8. A terminal device, comprising a processor, a memory, a transmitter;
the processor is configured to, at a processing start moment of the terminal device in a current channel occupancy time window of a network device, when remaining duration of the current channel occupancy time window of the network device is greater than or equal to duration for a transmitter of the terminal device to transmit a to-be-sent data packet to the network device, select, based on a user attribute of the terminal device and from a mapping relationship between the user attribute and a transmission mode, the transmission mode used by the transmitter to transmit the to-be-sent data packet to the network device, wherein, before the selecting the transmission mode used by the terminal device to transmit the to-be-sent data packet to the network device, the processor is further configured to obtain a second threshold of specified information from the network device, wherein the second threshold is used to determine whether the user attribute of the terminal device is a center user or an edge user, and the specified information comprises a coverage level or reference signal received power (RSRP), and, determine, the user attribute of the terminal device based on the second threshold, wherein, the user attribute in the mapping relationship comprises the user attribute of the terminal device, and the user attribute of the terminal device is the center user or the edge user; and the transmitter is configured to transmit the to-be-sent data packet to the network device in the transmission mode selected by the processor.

9. The terminal device according to claim 8, wherein each channel occupancy time window of the network device comprises a first time window and a third time window, the first time window is used by processor to control the terminal device to perform system synchronization with the network device, and the third time window is used by transmitter to transmit a data packet to the network device in a transmission mode selected by the processor; or each channel occupancy time window of the network device comprises a first time window, a second time window, and a third time window, the first time window is used by the processor to control the terminal device to perform system synchronization with the network device, and the second time window and the third time window are used by the transmitter to transmit a data packet to the network device in a transmission mode selected by the processor.

10. The terminal device according to claim 9, wherein when each channel occupancy time window of the network device comprises the first time window and the third time window, the mapping relationship comprises:

for a terminal device whose user attribute is an edge user, a transmission mode selected by the processor comprised in the terminal device is a first transmission mode, wherein when transmitting the to-be-sent data packet to the network device in the first transmission mode selected by the processor, the transmitter is specifically configured to:

transmit the to-be-sent data packet to the network device by using an available uplink channel in the third time window of the current channel occupancy time window of the network device.

11. The terminal device according to claim 10, further comprising a receiver;

the receiver is configured to, in the second time window of a channel occupancy time window next to the current channel occupancy time window of the network device, receive, by monitoring a downlink channel, acknowledgement information fed back by the network device, wherein the acknowledgement information is used to indicate whether the network device successfully receives the to-be-sent data packet transmitted by the transmitter.

12. The terminal device according to claim 9, wherein when each channel occupancy time window of the network device comprises the first time window, the second time window, and the third time window, the mapping relationship comprises:

for a terminal device whose user attribute is a center user, a transmission mode selected by the processor comprised in the terminal device is a second transmission mode, wherein before transmitting the to-be-sent data packet to the network device, the transmitter is further configured to:

send a buffer status report (BSR) to the network device by using an available uplink channel in the third time window of the current channel occupancy time window of the network device, wherein the BSR is used to request the network device to allocate a data packet transmission resource;

the terminal device further comprises a receiver;

the receiver is configured to, in the second time window of the channel occupancy time window next to the current channel occupancy time window of the network device, receive, by monitoring a physical downlink channel, a data packet transmission resource allocated by the network device; and when transmitting the to-be-sent data packet to the network device, the transmitter is specifically configured to:

transmit the to-be-sent data packet to the network device by using the data packet transmission resource that is allocated by the network device and that is received by the receiver.

13. The terminal device according to claim 8, before selecting the transmission mode used by the transmitter to transmit the to-be-sent data packet to the network device, the processor is further configured to:

determine that a quantity of data packets to be transmitted by transmitter to the network device is less than or equal to a first threshold.

14. The terminal device according to claim 8, wherein the user attribute of the terminal device is determined based on the second threshold and a measurement result that is measured by the terminal device and that is consistent with the specified information.

15. A non-transitory computer readable storage medium, comprising computer program code which when executed by a computer processor causes the computer processor to:

at a processing start moment of a terminal device in a current channel occupancy time window of a network device, when remaining duration of the current channel occupancy time window of the network device is greater than or equal to duration for the terminal device to transmit a to-be-sent data packet to the network device, select based on a user attribute of the terminal device and from a mapping relationship between the user attribute and a transmission mode, the transmission mode used to transmit the to-be-sent data packet to the network device, wherein, before the selecting, by the terminal device, the transmission mode used by the terminal device to transmit the to-be-sent data packet to the network device, obtaining, by the terminal device, a second threshold of specified information from the network device, wherein the second threshold is used to determine whether the user attribute of the terminal device is a center user or an edge user, and the specified information comprises a coverage level or reference signal received power (RSRP), and, determining, by the terminal device, the user attribute of the terminal device based on the second threshold, wherein, the user attribute in the mapping relationship comprises the user attribute of the terminal device, and the user attribute of the terminal device is the center user or the edge user; and transmit the to-be-sent data packet to the network device in the selected transmission mode.

16. The non-transitory computer readable storage medium according to claim 15, wherein each channel occupancy time window of the network device comprises a first time window and a third time window, the first time window is used to perform system synchronization with the network device, and the third time window is used to transmit a data packet to the network device in a selected transmission mode; or each channel occupancy time window of the network device comprises a first time window, a second time window, and a third time window, the first time window is used to perform system synchronization with the network device, and the second time window and the third time window are used to transmit a data packet to the network device in a selected transmission mode.

17. The non-transitory computer readable storage medium according to claim 16, wherein when each channel occupancy time window of the network device comprises the first time window and the third time window, the mapping relationship comprises:

a transmission mode selected by a terminal device whose user attribute is an edge user is a first transmission mode, wherein the first transmission mode comprises: transmitting the to-be-sent data packet to the network device by using an available uplink channel in the third time window of the current channel occupancy time window of the network device.

18. The non-transitory computer readable storage medium according to claim 17, wherein when each channel occupancy time window of the network device further comprises a second time window, the first transmission mode further comprises:

in the second time window of a channel occupancy time window next to the current channel occupancy time window of the network device, obtaining by monitoring a downlink channel, acknowledgement information fed back by the network device, wherein the acknowledgement information is used to indicate whether the network device successfully receives the to-be-sent data packet.

19. The non-transitory computer readable storage medium according to claim 16, wherein when each channel occupancy time window of the network device comprises the first time window, the second time window, and the third time window, the mapping relationship comprises:

a transmission mode selected by a terminal device whose user attribute is a center user is a second transmission mode, wherein the second transmission mode comprises:

sending a buffer status report (BSR) to the network device by using an available uplink channel in the third time window of the current channel occupancy time window of the network device, wherein the BSR is used to request the network device to allocate a data packet transmission resource;

in the second time window of the channel occupancy time window next to the current channel occupancy time window of the network device, obtaining by monitoring a physical downlink channel, a data packet transmission resource allocated by the network device; and transmitting the to-be-sent data packet to the network device by using the data packet transmission resource allocated by the network device.

20. The non-transitory computer readable storage medium according to claim 15, wherein the user attribute of the terminal device is determined based on the second threshold and a measurement result that is measured by the computer processor and that is consistent with the specified information.

* * * * *